United States Patent
Sun

(10) Patent No.: US 12,199,426 B2
(45) Date of Patent: Jan. 14, 2025

(54) ELECTRIC UTILITY LOAD DISTRIBUTION SYSTEMS AND METHODS

(71) Applicant: NAD Grid Corp, Cupertino, CA (US)

(72) Inventor: Thomas Shaofeng Sun, Cupertino, CA (US)

(73) Assignee: AmpUp, Inc., Santa Clara, CA (US)

(*) Notice: Subject to any disclaimer, the term of this patent is extended or adjusted under 35 U.S.C. 154(b) by 383 days.

(21) Appl. No.: 17/698,449

(22) Filed: Mar. 18, 2022

(65) Prior Publication Data

US 2022/0302701 A1    Sep. 22, 2022

Related U.S. Application Data

(60) Provisional application No. 63/223,308, filed on Jul. 19, 2021, provisional application No. 63/164,043, filed on Mar. 22, 2021.

(51) Int. Cl.
*H02J 3/00* (2006.01)
*G06Q 30/0283* (2023.01)
*G06Q 50/06* (2024.01)
*H02J 3/28* (2006.01)

(52) U.S. Cl.
CPC .......... *H02J 3/003* (2020.01); *G06Q 30/0284* (2013.01); *H02J 3/004* (2020.01); *H02J 3/28* (2013.01); *G06Q 50/06* (2013.01)

(58) Field of Classification Search
CPC .... H02J 3/003; H02J 3/004; H02J 3/28; H02J 3/144; H02J 2310/50; H02J 13/00001; G06Q 30/0284; G06Q 50/06
See application file for complete search history.

(56) References Cited

U.S. PATENT DOCUMENTS

| | | | |
|---|---|---|---|
| 6,741,442 B1 | 5/2004 | McNally et al. | |
| 8,364,609 B2 | 1/2013 | Ozog | |
| 9,588,537 B2 | 3/2017 | Westergaard | |
| 10,181,165 B2 | 1/2019 | Chen et al. | |
| 10,814,741 B2 | 10/2020 | Homma et al. | |

(Continued)

FOREIGN PATENT DOCUMENTS

KR        101659361 B1 * 9/2016

OTHER PUBLICATIONS

International Search Report for PCT/US22/20922, mailed Jul. 19, 2022.

*Primary Examiner* — Mohammad Ali
*Assistant Examiner* — Dhruvkumar Patel

(57) ABSTRACT

Systems and methods for load distribution, where a method can include: establishing an interface with a controlling architecture of an electric power distribution system, the electric power distribution system in communication with a set of outlets of utility-facing devices providing access to the electric power distribution system; returning a demand assessment from a demand model characterizing anticipated demand upon the one or more portions of the electric power distribution associated with the set of outlets, the set of outlets positioned at a set of sites; and executing an action for adjustment of load distribution throughout the set of sites, through the controlling architecture, based upon the demand assessment. The inventions can be used to achieve carbon emission goals by incentivizing better use of limited energy resources.

16 Claims, 14 Drawing Sheets

(56) References Cited

U.S. PATENT DOCUMENTS

| | | | |
|---|---|---|---|
| 2005/0102068 A1* | 5/2005 | Pimputkar | H02J 3/144 |
| | | | 700/291 |
| 2006/0276938 A1* | 12/2006 | Miller | H02J 3/008 |
| | | | 705/412 |
| 2008/0281663 A1* | 11/2008 | Hakim | H02J 3/466 |
| | | | 705/7.25 |
| 2011/0066300 A1* | 3/2011 | Tyagi | H02J 3/144 |
| | | | 700/291 |
| 2012/0064910 A1* | 3/2012 | Cornett | H04W 4/90 |
| | | | 455/456.1 |
| 2012/0083930 A1 | 4/2012 | Ilic et al. | |
| 2012/0136496 A1* | 5/2012 | Black | H02J 3/144 |
| | | | 700/291 |
| 2013/0066482 A1* | 3/2013 | Li | H02J 3/144 |
| | | | 700/297 |
| 2013/0274933 A1 | 10/2013 | Kelly et al. | |
| 2014/0129040 A1* | 5/2014 | Emadi | G06Q 50/06 |
| | | | 700/291 |
| 2014/0222486 A1 | 8/2014 | Kamel et al. | |
| 2015/0105924 A1 | 4/2015 | Lazaris | |
| 2015/0105928 A1 | 4/2015 | Lazaris | |
| 2015/0298567 A1* | 10/2015 | Uyeki | B60L 58/13 |
| | | | 320/155 |
| 2016/0075246 A1 | 3/2016 | Liptak | |
| 2017/0098229 A1 | 4/2017 | Vickery et al. | |
| 2017/0099056 A1 | 4/2017 | Vickery et al. | |
| 2018/0321646 A1* | 11/2018 | Koch | H02J 3/00 |
| 2019/0267807 A1 | 8/2019 | Zweigle et al. | |
| 2019/0375307 A1* | 12/2019 | Patil | H02J 7/0071 |
| 2023/0139514 A1* | 5/2023 | Tennant | H02J 3/32 |
| | | | 700/291 |

\* cited by examiner

100

Refining the demand model S150 collecting a set of training data streams derived from historical demand upon the electric power distribution system, the set of training data streams capturing demand by a population and a contextual dataset S151 applying a set of transformation operations to the set of training data streams S152 creating a training dataset derived from the set of training data streams and the set of transformation operations S153 training the demand model (comprising architecture for returning demand assessment) in one or more stages, based upon the training dataset S154 returning a demand assessment from the demand model S120

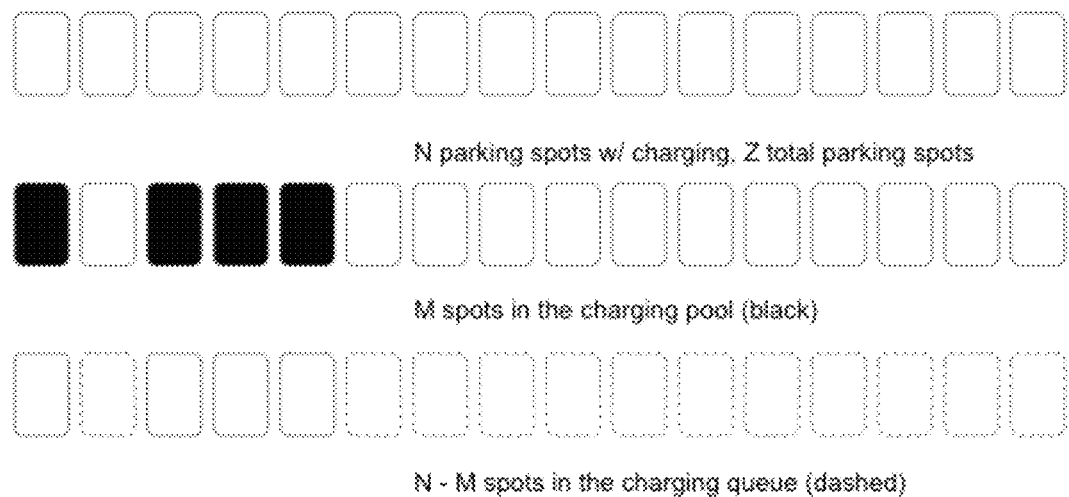

FIG. 4C detecting or receiving information pertaining to the state(s) of charge (SOC) of vehicles interfacing with the set of EVSEs  S401 maintaining battery health and improving battery life for each of a set of vehicles interfacing with the set of EVSEs by setting the state(s) of charge of the set of vehicles to a desired level (e.g., x% charge) and/or at a desired rate of charge, and charging one or more of the set of vehicles to the desired level/at the desired rate  S402

FIG. 4D retrieving, for each electric vehicle of a group of electric vehicles in association with respective charging sessions: an arrival SOC, an arrival time, a needed departure SOC, an actual departure SOC, and a departure time S51

↓ categorize individual electric vehicles of the group of electric vehicles as belonging to different subgroups with different charging needs upon determining a charging power needed by each vehicle in relation to a dwell time for each vehicle S52

↓ coordinate distribution of the group of electric vehicles across a set of EVSEs based upon at least one of power output capabilities of the set of EVSEs and availability of each of the set of EVSEs S53

FIG. 5A

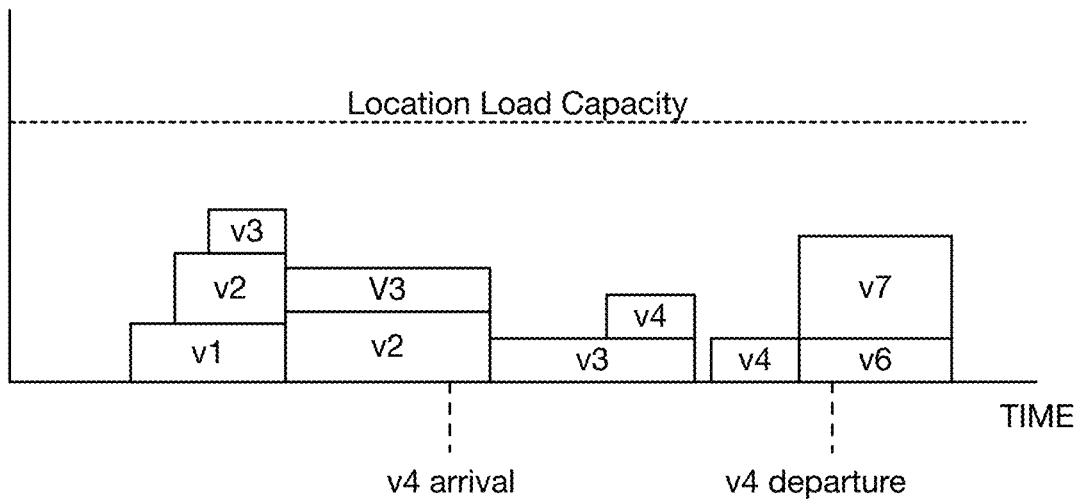

FIG. 5B

ELECTRIC UTILITY LOAD DISTRIBUTION SYSTEMS AND METHODS

CROSS-REFERENCE TO RELATED APPLICATIONS

This application claims the benefit of U.S. Provisional Application No. 63/164,043, filed on 22 Mar. 2021 and U.S. Provisional Application No. 63/223,308 filed on 19 Jul. 2021, each of which is incorporated in its entirety herein by this reference.

TECHNICAL FIELD

The disclosure generally relates to fields pertaining to load distribution technologies for electric utilities.

BACKGROUND

The adoption of electric vehicles and other systems and devices requiring charge has significantly increased demand on the grid over recent years, and will continue to do so as such vehicles, systems, and devices become even more mainstream. However, before the integration of additional infrastructure and sources of clean electricity, such increased demand will cause disruptions in the ability of electric utilities companies distribute power in order to meet the demand. In particular, the three power grids of the United States of America have struggled with issues in recent times due to a combination of factors including weather events attributed to climate change, boundaries affecting transmission across different territories, political factors, increased demand, and other factors. These, and other factors, exist internationally as well.

Thus, there is a need in the electric utilities field for improved systems and methods for load distribution.

BRIEF DESCRIPTION OF THE FIGURES

FIGS. 1A-1B depict flowcharts of embodiments of a method for load distribution.

FIGS. 2A-2D depict example interfaces associated with a method and system for load distribution.

FIGS. 4A-4D depict embodiments of a method for load management, in relation to generating demand components of a demand model.

FIGS. 5A-5B depict embodiments of a method for load management for a fleet, in relation to generating demand components of a demand model.

DESCRIPTION OF THE EMBODIMENTS

Figure 1A:
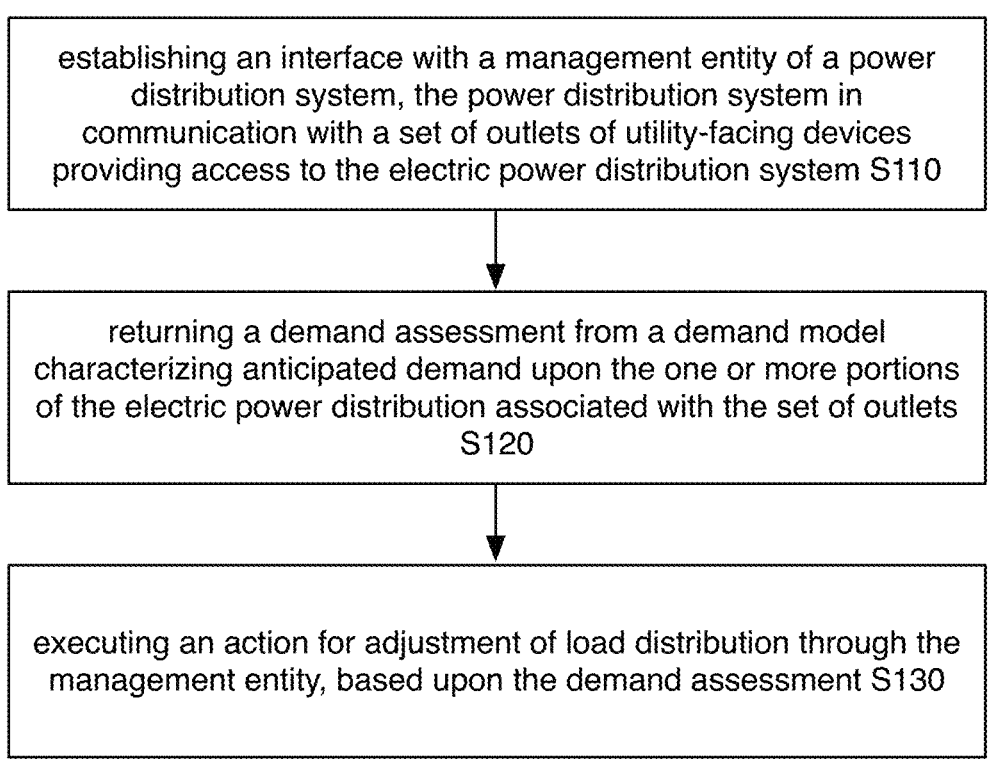

The following description of the embodiments (e.g., including variations of embodiments, examples of embodiments, specific examples of embodiments, other suitable variants, etc.) is not intended to be limited to these embodiments, but rather to enable any person skilled in the art to make and use the invention(s).

All publications, patents, and patent applications mentioned in this specification are herein incorporated by reference in their entireties for all purposes and to the same extent as if each individual publication, patent, or patent application was specifically and individually indicated to be incorporated by reference.

Furthermore, where a range of values is provided, it is understood that each intervening value, between the upper and lower limit of that range and any other stated or intervening value in that stated range is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either of those included limits are also included in the invention.

1. Benefits and Applications

The invention(s) described can confer several benefits over conventional systems and methods.

For instance, the invention(s) provide architecture for centralized and decentralized utilities providers to properly distribute load and/or shed load in response to spikes in demand, non-uniform demand (e.g., in relation to time of day, in relation to seasons, in relation to weather-related events, in relation to disasters, in relation to cyberattacks, in relation to other attacks, etc.), increases in demand due to additional vehicles, systems, and devices requiring power, and/or other factors.

As such, the invention(s) provide technologies for achieving reduced carbon emission goals by enabling and incentivizing better use of limited energy resources. The invention(s) can be applied currently, as well as with evolution of infrastructure and provision of electricity through centralized and decentralized utility providers.

The invention(s) also provide architecture for modeling and anticipating demand and changes in demand (according to various time scales), with returned outputs guiding actions that can be executed to prevent load distribution issues and prevent catastrophic failures.

The invention(s) also include systems and methods for management of load distribution and shedding, with subsystems configured to properly incentivize end users to behave in manners that reduce demand under various circumstances.

The invention(s) also include architecture for generation of training and test data, for training of models, in various phases, to optimize control of load distribution and shedding in response to a wide range of demand events.

The invention(s) also support green initiatives, with respect to demand shedding, adoption of clean electricity sources, and implementation of protocols to promote use of clean electricity and improved user behaviors to reduce carbon emissions.

The invention(s) can additionally or alternatively include electronic elements with associated software and/or firmware architecture for prevention of hacking and/or forms of cyber attacks against utilities companies and infrastructures.

The invention(s) can additionally or alternatively provide other suitable benefits.

2. Introduction and Background

Electric grid infrastructure is becoming more distributed and decentralized, domestically and internationally, with renewable generation technology, microgrids, nano-grids, power storage devices (e.g., batteries), and other smart assets. In order for utilities to provide reliable services to this dynamic grid, a common language or communication protocol (i.e., Open Automated Demand Response (OpenADR)) was developed so all smart assets can speak the same language and integrate with aggregators or utilities.

The OpenADR protocol documents how the utilities or aggregators communicate conditions of demand and supply of electricity on the grid, in real time, to smart assets, so load demand having flexibility can be quickly identified in times of peak demand, in order to shave off demand and shift distribution to flexible demands to a later time when demand is not at a peak. In particular, OpenADR implements a communications data model designed to facilitate sending and receiving demand response signals from a utility or independent system operator to electric end-users. The intention of the data model is to interact with building and industrial control systems that are pre-programmed to take action based on a demand response signal, enabling a demand response event to be fully automated, with no manual intervention. The OpenADR specification is a highly flexible infrastructure design to facilitate common information exchange between a utility or Independent System Operator (ISO) and their end-use participants. The concept of an open specification is intended to allow anyone to implement the signaling systems, providing the automation server or the automation clients.

There are current implementation issues and technical deficiencies with respect to OpenADR and other communication protocols (e.g., Energy market Information Exchange (EMIX) models, Energy Usage Information Models, Facility Smart Grid Information Model, BACnet, LonMark, ZigBee, etc.). Timing issues (e.g., decentralization hitting a critical point where central control is no longer primary, EV adoption and other systems/devices contributing to unpredictability of demand, etc.) have caused execution and efficacy problems. Furthermore, technical barriers to use of OpenADR are too high. For example, the most progressive utility is estimated to be unable to send, receive, and process OpenADR signals until 2025.

In particular, the ability to adjust load in real time improves resilience of the grid. Trends involving electric vehicles (EVs) and future widespread adoption of electrification are driving this due to at least the following factors: 1) there is a significant portion of load from EVs, internet of things (IOT) devices (e.g., home appliances, smart lights, etc.) and/or other devices 2) Utilities are regulating EV charging, and with the help of industry standard protocols, EV charging stations are getting registered with aggregators or utilities. In particular, with respect to EV charging, EV charging stations are subject to standard protocols (e.g., open charge point protocol [OCPP]) with cloud control, which are subject to standard communication protocols (e.g., OpenADR) with various aggregator/utilities. In contrast, with respect to general IOT devices: IOT devices lack regulated standard protocols with cloud control/aggregators, which have standard communication protocols (e.g., OpenADR) with various aggregator/utilities. Thus, standard protocols governing operations between individual IOT devices and cloud control are lacking. Example IOT device protocols include OpenHANX10, Insteaon, P1901, HomePlug, HomeKit Accessory Protocol (HAP), WPA, WPA2, and/or other protocols.

The inventions covered here are derived from widespread analysis of utilities, electric vehicle manufacturers, and electric vehicle charging stations and cover systems and methods for providing functionalities across various entities and systems: a community manager (e.g., site host admin portal), a mobile application (e.g., an end-user facing tool), and a utility facing devices (e.g., power output device configured to interface with a vehicle, system, or device having periods of demand for electricity).

Methods and systems described can additionally or alternatively be implemented and/or integrated with embodiments, variations, and examples of invention(s) described in U.S. application Ser. No. 16/983,175, which is herein incorporated in its entirety by this reference.

3. Method

As shown in FIG. 1A, an embodiment of a method for load distribution includes: establishing an interface with a controlling architecture or other management entity (e.g., site host of a set of chargers) of an electric power distribution system, the electric power distribution system in communication with a set of outlets of utility-facing devices providing access to the electric power distribution system Silo; returning a demand assessment from a demand model characterizing anticipated demand upon the one or more portions of the electric power distribution associated with the set of outlets S120; and executing an action for adjustment of load distribution through the controlling architecture or other management entity, based upon the demand assessment S130. Embodiments, variations, and examples of executed actions contributing to improved load distribution based upon demand (e.g., actual demand, anticipated demand) are described in more detail below.

In some variations, as shown in FIG. 1B, the method 100 can further include refining the demand model S150, wherein refining the demand model includes: collecting a set of training data streams derived from historical demand upon the electric power distribution system, the set of training data streams capturing demand by a population and a contextual dataset S151, applying a set of transformation operations to the set of training data streams S152, creating a training dataset derived from the set of training data streams and the set of transformation operations S153, and training the demand model (comprising architecture for returning demand assessment) in one or more stages, based upon the training dataset S154.

The method 100 functions to provide architecture for utilities companies or other management entities managing load distribution through utility-facing devices to properly distribute load and/or shed load in response to spikes in demand, non-uniform demand, availability of green energy or otherwise less expensive sources of electricity, increases in demand due to additional vehicles, systems, and devices requiring power, and/or other factors. The method 100 also functions to provide architecture for modeling and anticipating demand and changes in demand (according to various time scales), with returned outputs guiding actions that can be executed to prevent load distribution issues and prevent catastrophic failures, by providing incentives for load shedding and other actions. The method 100 also includes functionality for refining models for optimization of load distribution and shedding in response to a wide range of demand events. The method 100 also support green initiatives, with respect to demand shedding, adoption of clean electricity sources, and implementation of protocols to promote use of clean electricity and improved user behaviors to reduce carbon emissions.

The method 100 can be implemented by an embodiment, variation, or example of the system 200 described in Section 4 below, or another suitable system.

3.1 Method—Interface with Control Architecture/Management Entity

Block S110 recites: establishing an interface with a controlling architecture or other management entity of an electric power distribution system, the electric power distribution system in communication with a set of outlets of utility-facing devices providing access to the electric power distribution system. Block S110 functions to provide a tool for the controlling architecture or other management entity to manage load distribution and load shedding in response to actual or anticipated demand events, based on outputs returned by subsequent steps of the method 100.

In variations, the power distribution system can include or host of one or more sites (e.g., geographically-defined sites) for distributing power through utility-facing devices. The power distribution system can thus be incorporated with or otherwise communicate with one or more electric utilities (e.g., public utilities, private utilities, etc.) engaging in electricity generation, electricity storage, and/or electricity distribution according to various regulations and oversight structures. In variations, the electric power distribution system can include one or more decentralized portions (e.g., distributed supply and demand power generation and distribution subsystems that implement renewable energy sources) that and one or more centralized portions (e.g., centralized grids that provides unidirectional energy flow to consumers from central generators). Currently, centralized portion(s) dominate in the world, and in the U.S. there are three main grids (e.g., the Eastern Grid, the Western Grid, and the Texas/ERCOT Grid), which operate independently. The method(s) and system(s) described herein can be applied to and/or can affect operations in scenarios where the centralized portion(s) are dominant over decentralized portion(s). Alternatively, the method(s) and system(s) described herein can be applied to and/or can affect operations in scenarios where transitions to dominance by decentralized portions(s) are occurring, and/or wherein the decentralized portion is competitive with or otherwise dominant over the centralized portion (e.g., in terms of energy generated or provided).

Examples of centralized portions can include the Eastern Grid, the Western Grid, and the Texas/ERCOT Grid in the United States, the Quebec Interconnection, the Alaska Interconnection, the National Electricity Transmission Grid of Mexico, the State Grid of China, the China Southern Power Grid, the Indian Electric Grid, the European Network of Transmission System Operators, the National Electricity Transmission Grid of Russia, the Interconnected South American Power Grid, the Eastern Grid of Japan, the Western Grid of Japan, the National Power Grid of Korea, Grids of Africa, the Australian electrical grid, and/or other centralized portions.

Examples of decentralized portions can include autonomous energy grids (AEGs) with distributed energy sources, on-site generation sources, distributed energy resources, and/or other resources.

Decentralized portions and/or centralized portions can implement renewable energy sources (e.g., hydroelectric power, biomass-derived power, biogas-derived power, solar power, wind power, geothermal power, etc.) and include microgrids with energy storage subsystems.

The growth of AEGs continues to drive innovation in relation to a network of technologies and distributed controls that work together to efficiently match bi-directional energy supply to energy demand, in a manner that achieves zero carbon and/or negative carbon goals. AEGs can be composed within one another, where subsections of AEGs use communication and control protocols for providing power and/or receiving power based upon customer demand, available generation, and pricing.

Utility facing devices can include chargers (e.g., electric vehicle supply equipment units (EVSEs), residential chargers, commercial chargers, etc.), outlets (e.g., commercial property outlets, residential property outlets, etc.), power-distribution infrastructure, and/or other suitable utility-facing devices. Embodiments, variations, and examples of utility-facing devices are described in U.S. application Ser. No. 16/983,175, filed 3 Aug. 2020, which is herein incorporated in its entirety by this reference. In particular, EVSE unit chargers can support Type 1 AC connectors, Type 2 AC connectors, 30 pin plugs, Rapid Charging/DC CHAdeMO connectors, Combined Charging System (CCS) connectors, and type 2 connectors. AC charging can provide power through connectors with ratings of 3.7 kW, 7 kW, 22 kW (three phase), and/or other ratings. DC charging can provide power through connectors with ratings of 50 kW, 100 kW, 250 kW, 350 kW, and/or other ratings. The set of outlets can be positioned at a set of sites (e.g., geographical sites, sites within one or more property lots, etc.). In examples, the set of outlets can be provided at home (e.g., for home charging), in public settings (for public charging), at commercial properties (e.g., for charging at work, for charging at other businesses).

Establishing the interface in Block Silo can include providing an application interface (e.g., mobile application interface, web application interface, etc.) to the management entity, where the management entity can access the application interface through one or more devices. In examples, the one or more devices can include personal computing devices, mobile computing devices, tablets, wearable computing devices (e.g., wrist-coupled wearable computing devices, head-coupled wearable computing devices, etc.), and/or other suitable computing devices.

The interface can thus communicate with the electric power distribution system and other devices (e.g., management entity devices, end-user devices, etc.) by wired and/or wireless connections, in order to determine statuses of elements in communication with the electric power distribution system, and/or provide control of operation of elements in communication with the electric power distribution system for load redistribution and load shedding. As such, the interface can allow the controlling architecture to receive signals and information that can be provided as inputs to the demand model in Step S120 below, and to execute actions for controlling or adjusting load distribution in relation to Step S130 below.

In variations shown in FIGS. 2A-2D, an example of the interface includes or otherwise comprises a first subset of digital elements 101 encoding and/or communicating information pertaining to load and demand characteristics. In examples, the first subset of digital elements can include one or more of: visual objects (e.g., images, video, text), audio objects, haptic feedback elements, and/or other suitable elements. Information encoded and/or communicated by such elements can include one or more of: utility pricing (e.g., plug-in fees per session, per session caps, fixed pricing information, tiered pricing information, pricing information based for each available utility company, pricing information based upon geographic location, pricing information based upon time, etc.), available exemption categories, demand-associated event information (e.g., event descriptor, timing of event, calendar of demand-associated events, etc.), information pertaining to participating sites associated with utility facing devices, output characteristics of tech of the utility facing devices/plugs for receiving power (e.g., charger levels, charger type, charger output characteristics, etc.), historical achievements in load distribution/load shedding (e.g., amount of demand shed per event, aggregate amount of demand shed, etc.), information regarding groups (e.g., cohorts, fleets, etc.) of end-users for which different load distribution/shedding categories are appropriate, information regarding groups of end-users with different load distribution and shedding requirements, and/or other suitable information.

Furthermore, as shown in FIGS. 2A-2D, variations of the interface include a second subset of digital elements 102 including adjustable controls (e.g., by switches, by sliders, by manual entry of values, etc.) for controlling load distribution operation modes (e.g., with respect to load shedding), or for controlling transitions of the electric power distribution subsystem between a set of load distribution operation modes. In particular, the adjustable controls include supporting architecture for manipulation (e.g., by the management entity, by another entity) using various input devices (e.g., touch pads, touch screens, mouse, keyboard, audio input device, haptic input device, joystick, dial, etc.). In relation to manipulation and control (e.g., resulting from model outputs described in more detail below), the method 100 can include receiving a suitable input by the management entity or another suitable entity, and rendering, adjusting rendering of, and/or transforming digital object characteristics in response to the suitable input, in order to control load distribution operation modes (e.g., transitioning between different load distribution operation modes of a set of load distribution operation modes). As such, a received input provided by the controlling architecture (e.g., through a management entity), can transition the electric power distribution system between a first load distribution operation mode and a second load distribution operation mode of the set of load distribution operation modes, where operation modes are described in further detail below, in relation to various executed actions for load distribution adjustments.

Figure 2A:
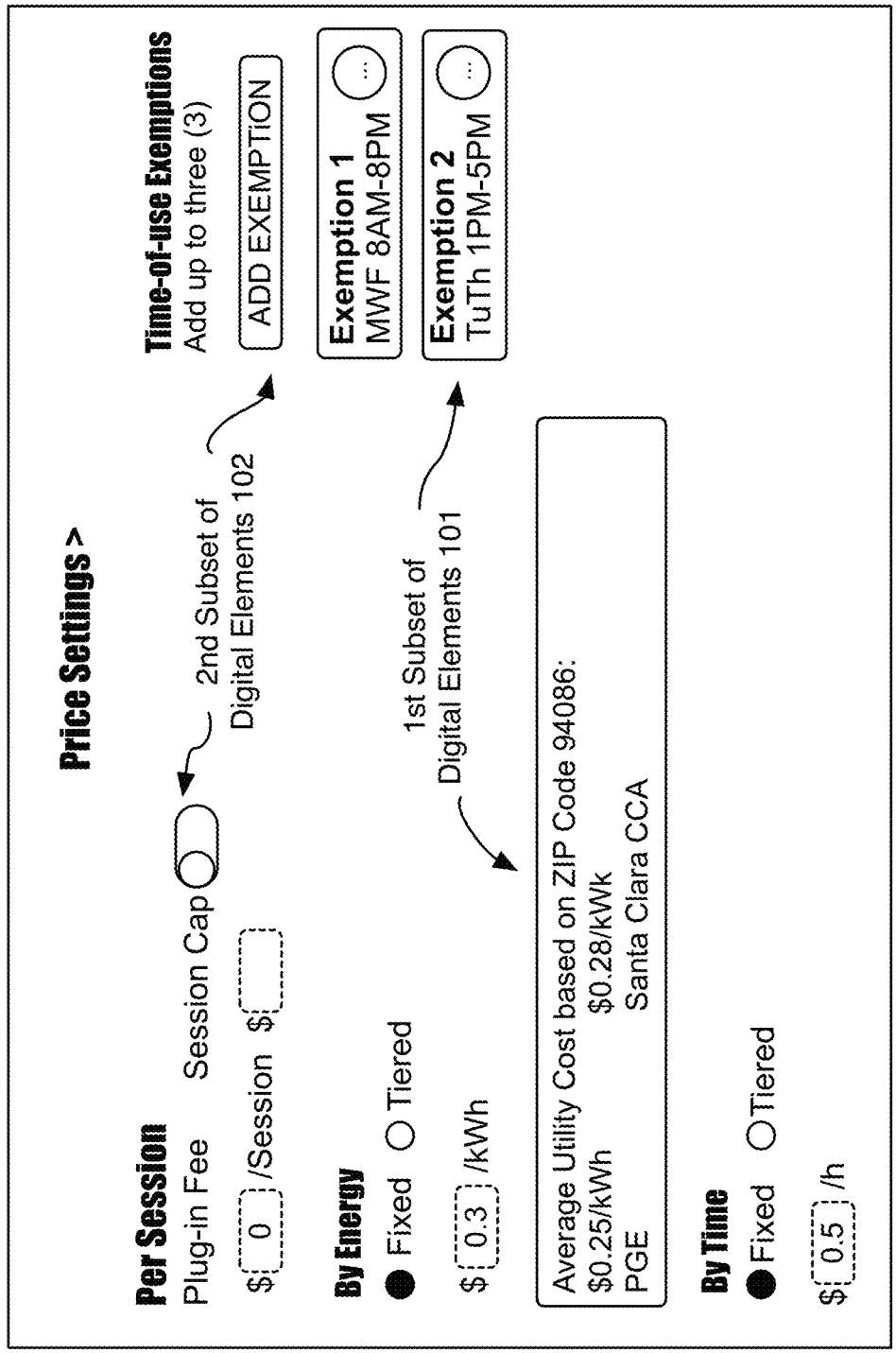
Figure 2B:
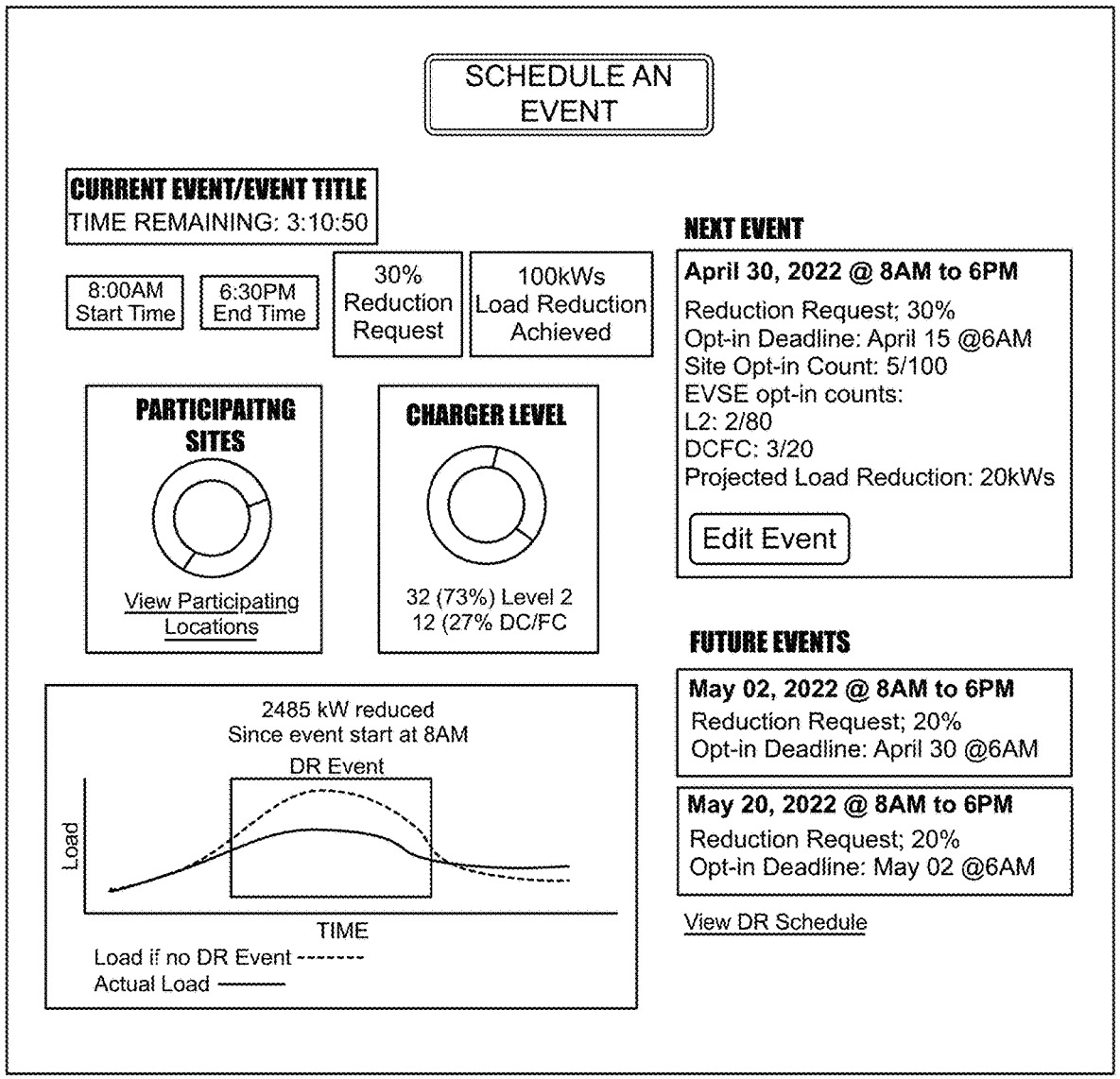
Figure 2C:
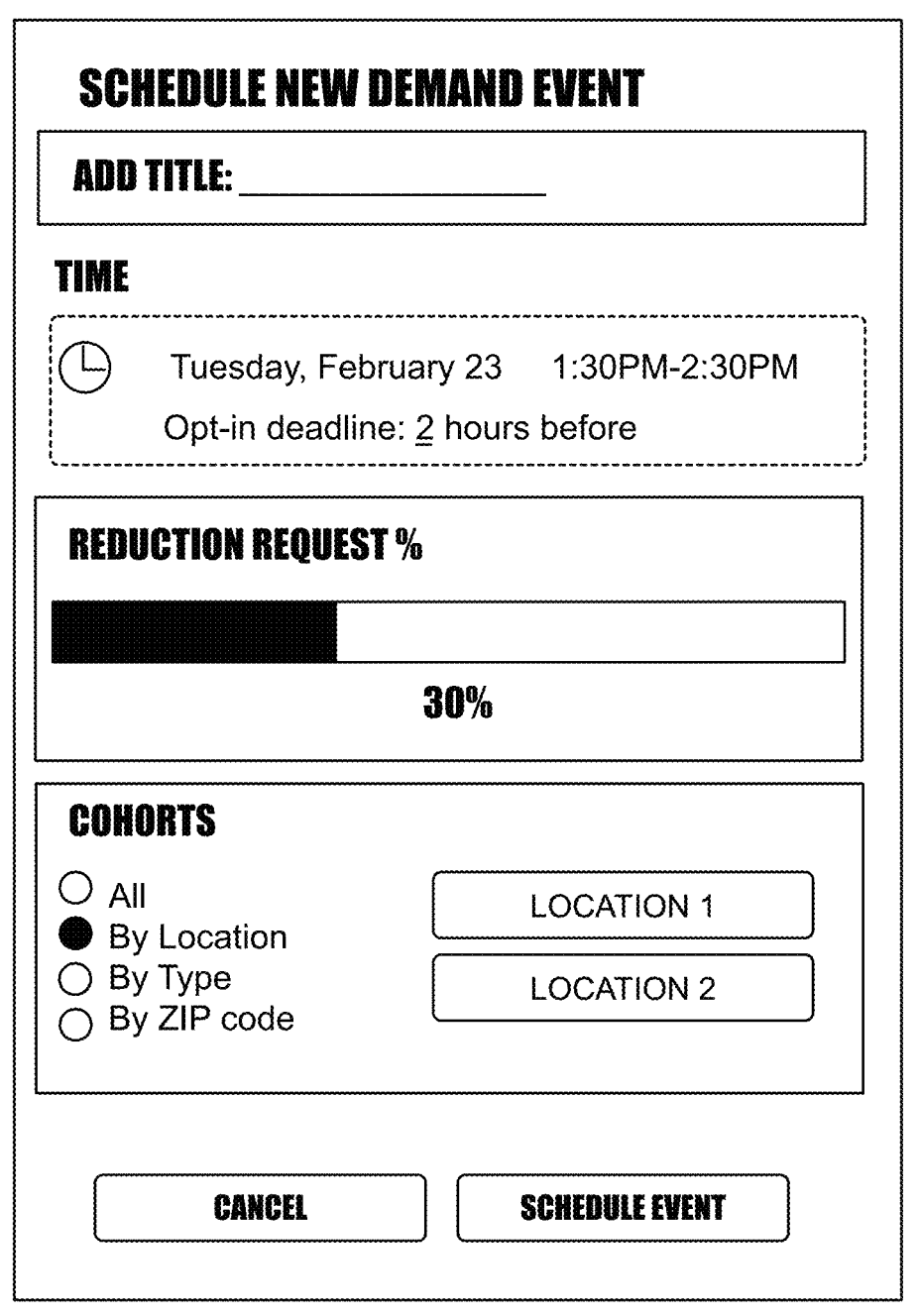
Figure 2D:

In examples, the second subset of digital elements 102 can include one or more of: objects responsive to inputs for toggling between different modes (e.g., in relation to setting plug-in fees per session, in relation to setting session time limits cap, in relation to setting fixed pricing parameters per unit energy, in relation to setting tiered pricing parameters per unit energy, in relation to setting fixed pricing parameters per unit time, in relation to setting tiered pricing parameters per unit time, etc.), objects responsive to inputs for adjusting (e.g., setting, adding, or deleting) time-of-use exemptions, objects responsive to inputs for controlling scheduling of demand events and associated load shedding, objects responsive to inputs for defining groups/cohorts (e.g., by location, by type, by another factor, etc.), objects responsive to inputs for controlling load reduction states (e.g., to a percentage of a baseline load, by a certain amount, to another suitable level, etc.), objects responsive to inputs for determining time-of-use pricing according to a set of time windows, objects responsive to inputs for responding to requests (e.g., by a utility experiencing a demand event), where such objects can provide the management entity with options to respond according to a set of response types (e.g., as shown in FIG. 2D) including a first response type that allows the management entity to not respond to a request, a second response type that allows the management entity to respond to a request in a manual manner (e.g., subject to each event), a third response type that allows the management entity to respond to the request in a default or automatic manner, and/or a fourth response type that allows the management entity to pass decision-making onto the end user (e.g., a driver of an electric vehicle, a property owner using power for various devices, a property manager, user associated with one of the set of outlets, etc.). The second subset of digital elements can, however, include other suitable elements affecting other states of operation of the electric power distribution system and/or associated devices.

For instance, in some variations, the second subset of digital elements 102 of the interface can provide functionality for or otherwise facilitate operation modes in which EVs or other devices/apparatuses push energy stored in their batteries back onto the grid. As such, the interface and associated architecture can coordinate operation modes in which entities (e.g., a secondary market of energy sellers, such as fleet managers) can deliver energy back to the grid. In variations, such entities can offer their own electricity rates or otherwise benefit from delivery of energy to the grid. In one such example, large fleets can store energy within vehicle batteries during low demand times (e.g., off-duty and low utility rate times), from utilities or renewable energy producers that have extra energy that they want to sell. The interface and associated architecture can then enable responses to requests or offers to EVs/operators either charge up in their own charging depots or the renewable energy producer's micro/nano grid. Then during high demand times (e.g., peak hours, grid stress times, etc.), the EVs/operators can be incentivized to offer their energy back for a benefit.

Establishing the interface in Block S110 can additionally or alternatively include establishing hardware interfaces with the electric power distribution system and/or the set of outlets of utility-facing devices associated with the electric power distribution system. For instance, hardware interfaces can include one or more of: meters (e.g., for detection of use characteristics), smart outlets/plugs/switches/etc. (e.g., that allow connected devices and/or utility-associated entities to control operation states of the smart interfaces), and/or other suitable hardware interfaces.

Establishing the interface in Block S110 can, however, be performed in another suitable manner.

3.2 Method—Demand Assessment Generation

Block S120 recites: returning a demand assessment from a demand model characterizing anticipated demand upon the one or more portions of the electric power distribution associated with the set of outlets. Block S120 can additionally or alternatively include assessing live demand and generating outputs for guiding appropriate responses.

In variations, the demand model comprises architecture for processing a set of inputs, applying a set of transformation operations to the set of inputs, and returning the demand assessment and/or other suitable outputs. In variations, the demand model can include optimization sub-architecture and control sub-architecture, with feedback controller structures communicating inputs and outputs between the control sub-architecture and optimization sub-architecture.

In variations, the optimization sub-architecture can perform real-time or near-real-time optimization of energy distribution of centralized portions and decentralized portions of the electric power distribution system, upon processing provided inputs discussed in more detail below. In particular, operation of individually controllable decentralized portions and/or aggregates of decentralized portions (e.g., treated as an individual source with a point of connection), as well as operation of centralized portions, can be optimized according to the demand model, with a solution-to-demand (actual demand, anticipated demand, predicted demand)-based approach. The optimization sub-architecture can guide adjustments to aggregate power distribution of the centralized and decentralized portions, on a minute-, second-, or sub-second-timescale, without open-loop or feedforward architecture, and with implementation of multilevel, variable time period convex optimization architecture. Such multilevel architecture can optimize power generated by decentralized and centralized portions of the electrical power distribution system at a first level, power consumed by decentralized (and centralized portions) of the electrical power distribution system at a second level, and account for constraints of the centralized and decentralized portions of the electrical power distribution system at a third level. Output characteristics of the centralized and decentralized portions of the electrical power distribution system can be continuous or discrete in relation to power commands. Constraints can include power output limitations (e.g., by energy source type, including renewable sources) and/or limitations associated with preferred use of clean sources over "dirty" sources. Connection points of the optimization architecture can have associated voltage, current, and power flow characteristics that affect voltage, current, and power flow characteristics at related connection points, in relation to generating demand assessments and guiding load distribution from the centralized and decentralized portions of the electric power distribution system.

Constrained optimization sub-architecture of the demand model can implement first-order conditions (e.g., Karush-Kuhn-Tucker (KKT) conditions, other first-order conditions), second-order conditions, and/or any other suitable conditions for optimality.

However, in other variations, the optimization sub-architecture can include other optimization architecture derived from other approaches (e.g., continuous optimization, discrete optimization, unconstrained optimization, etc.). In examples, optimization architecture can implement, gradient descent, moment-based approaches, Adagrad, RMSProp, Adam optimization, and/or other types of optimization architecture, and in the context of power distribution, architecture can be adapted from AC optimal power flow algorithms, non-linear programming, convex relaxation, distributed solution methods applying Lagrangian functions for solution decomposition for different portions of the electric power distribution system.

Control sub-architecture can implement feedback-based control of outputs of the optimization sub-architecture, in order to stabilize outputs for non-ideal, real-world conditions. Control sub-architecture can include feedback controller architecture, where, in examples said feedback architecture implements gradient approaches with continuous-time primal primal-dual gradient methods applied to proximal augmented Lagrangian functions. However, other gradient methods applied to other functions can be implemented in the feedback controller architecture, based upon desired stability specifications.

The demand model can thus guide control of power flow (which can be provided and/or adjusted continuously), even with non-continuous measurements of demand (e.g., based upon training and refinement described in more detail below), for a time-varying system.

In variations, the set of inputs can include a time input (e.g., time point, time window, etc.) associated with time of a demand event on the scale of seconds, minutes, hours, days, months, seasons, or another suitable time scale. Additionally or alternatively, the set of inputs can include a geographic input (e.g., associated with a site hosting charging devices, associated with a neighborhood, associated with a residential address, associated with a commercial address, associated with types of buildings, associated with types of businesses, associated with an event site, associated with a manufacturing site, associated with a parking lot, etc.), a grid-sector input (e.g., an identifier of a grid or grid portion of interest), a climate event input (e.g., an identifier of a weather-associated event, an identifier of a weather disaster-associated event, an identifier of a storm event, an identifier of a pressure-associated event, etc.), an infrastructure event (e.g., an identifier of an infrastructure failure event, an identifier indicating proper operation of infrastructure, etc.), a source input (e.g., pertaining to green and non-green sources of power generation), a contextual input (e.g., an input associated with electric vehicle charging demand and/or expected number of electric vehicles operating at a given time point, an input associated with expected volume of electricity use by various devices, such as internet-of-things (IOT) devices at a given time point, an input associated with expected volume of electricity use by various systems at a given time point, etc.), and other suitable inputs. Additionally or alternatively, the set of inputs can include inputs generated by one or more measurement devices (e.g., meters and/or other sensors) of electronic devices, electric vehicles, systems, and utility-facing devices, where the inputs include signal streams generated and transmitted by the meters and/or other sensors.

The set of transformation operations can be applied to signal streams or other derivative data and include one or more of: signal conditioning, noise removal, artifact processing, or other signal processing operations. Such operations can ensure input quality prior to further processing in various method steps. In some variations, preprocessing inputs can include performing one or more steps to verify completeness or suitability of data (e.g., no inputs that are nonsensical, no lapse in the signal streams, etc.). Transformation operations can additionally or alternatively include one or more of: denoising, filtering, smoothing, clipping, transformation of discrete data points to continuous functions, and performing any other suitable data conditioning process. Removal of anomalies of inputs and/or signals can include one or more filtering techniques. In specific examples, filtering can include one or more of: Kalman filtering techniques, bootstrap filtering techniques, particle filtering techniques, Markov Chain Monte Carlo filtering techniques; metropolis-Hasting methods; approximations (e.g., Laplace approximations); and/or other signal processing approaches.

Inputs (raw and/or processed inputs) can be processed with classification architecture and/or other suitable model architecture (e.g., regression architecture, tree architecture, node architecture, layer architecture, etc.) to return the demand assessment, where additional details on model architecture and training are further described in Section 3.2.1 below.

The demand assessment can include returned predications of anticipated demand on the power distribution subsystem, in a manner that can be affected by modulation of load distribution through utility-facing devices associated with the management entity. The anticipated demand can be determined for the current time point or window, or for one or more future time points/windows. The demand assessment can also incorporate and/or return actual current demand parameters (e.g., in relation to future predictions). Furthermore, the demand model can be structured to return confidence in demand characterizations.

The demand assessment can include predictions of demand in terms of relevant power units (e.g., in terms of kilowatts; in terms of other units). The demand assessment can additionally or alternatively return a proposal of power sources required to meet the demand in relation to various scenarios (e.g. a first scenario in which no load is shed, a second scenario in which a first portion of load is shed, a third scenario in which a second portion of load is shed, etc.). Additionally or alternatively, the demand assessment can return demand characteristics associated with each of a set of groups/cohorts (e.g., residential demand, commercial demand, demand by specific customers, demand by patient care sites, demand by first responders, demand by public service organizations, demand by government operations, demand by electric vehicles, demand by electric aircraft, etc.).

The demand assessment, as described above, can be provided in real-time or near-real-time, due to the time varying nature of the problem. As such, the demand assessment can be used to actively adjust load distribution contemporaneously with (e.g., proximal in time to) an event or time of interest. In examples, the demand assessment can be returned within 1 second, 2 seconds, 3 seconds, 4 seconds, 5 seconds, 6 seconds, 7 seconds, 8 seconds, 9 seconds, 10 seconds, 20 seconds, 30 seconds, 40 seconds, 50 seconds, 1 minute, 5 minutes, any intermediate value, and/or other durations of time from when inputs are provided to the demand model.

In variations, the demand assessment can include an IOT demand component and an EV demand component. The IOT demand component can be extracted using a set of non-regulated and non-standard protocols with cloud control subsystems (e.g., with an application programming interface, with a device that extracts usage characteristics based upon signatures of devices plugged into the set of outlets, etc.). The EV demand component can be extracted using a regulated and standard protocol with cloud control subsystems, and/or other information extracted at the set of sites (e.g., number of EVs in the region associated with the set of sites). For instance, controlled distribution of load through EVSE units servicing EVs at the set of sites can provide information pertaining to the EV demand component. Examples of controlled load distribution are provided in applications incorporated by reference and in Section 3.2.1 below.

Figure 3:
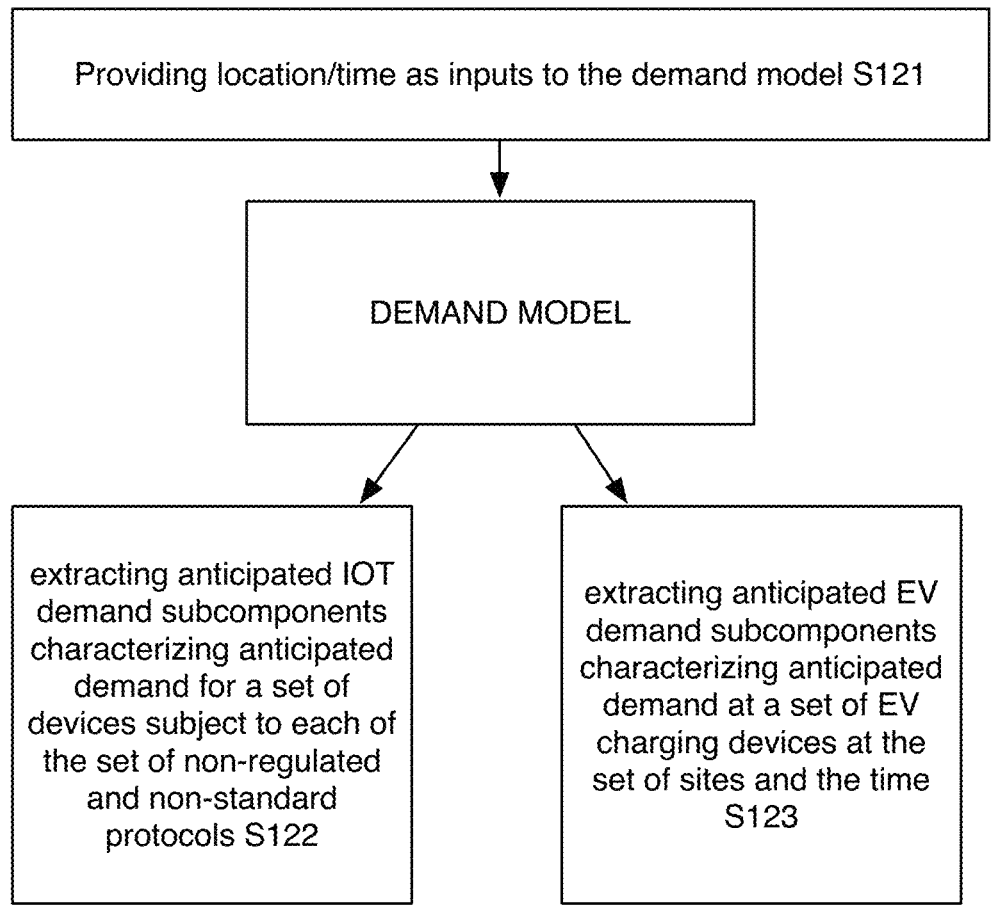
FIG. 3 depicts an example flow of generating demand components from an embodiment of a demand model.

In one example, shown in FIG. 3, the IOT demand component characterizes anticipated IOT device usage at a location and a time, and the method 100 can include: providing the location and the time as inputs to the demand model S121, and for each of the set of non-regulated and non-standard protocols, and extracting anticipated IOT demand subcomponents characterizing anticipated demand for a set of devices subject to each of the set of non-regulated and non-standard protocols, at the location and the time S122. In relation to Step S122, the IOT demand subcomponents can characterize anticipated IOT demand for the set of devices individually (e.g., for each device, for each appliance, for each smart home subsystem, etc.), and/or in aggregate (e.g., at the property level, at the building complex level, etc., for one or more properties associated with the set of sites). Methods of retrieving IOT demand components and subcomponents based upon device signatures are provided in Section 3.2.2 below.

Also shown in FIG. 3, the EV demand component characterizes anticipated usage at the set of sites and a time, and the method 100 can include: providing the set of sites and the time as inputs to the demand model S121 and extracting anticipated EV demand subcomponents characterizing anticipated demand at a set of EV charging devices at the set of sites and the time S123.

The location can be an address, a site of the set of sites (e.g., an EVSE site), a set of addresses, a region, global positioning system (GPS) coordinates, or another geographic location. The time can be a historical time point, a current time point, a future time point, or a window of time.

The demand assessment can further include proposed recommendations for shedding load, distributing load, and/or otherwise modulating load or incentivizing desired changes in load use/distribution, in relation to Step S130 described in more detail below. The demand assessment can, however, include other suitable information. For instance, the demand assessment can include information pertaining to non-EV and non-IOT device demand, with inclusion of components related to demand by general appliance (e.g., kitchen appliances, cleaning appliances, bathroom appliances, heating appliances, cooling appliances, etc.), factory/manufacturing-associated demand, server demand and cooling requirements, medical care-associated demand, agriculture management-associated demand, and/or other demand components.

3.2.1 EVSE Management in Relation to Demand Assessments

In relation to Step S123 above, EV demand components can be determined from scheduled and/or ad-hoc charging sessions, with load control scheduling based upon a flow of scheduled and ad-hoc charging sessions at a set of sites and/or a set of time windows. In particular, platforms for load management, distribution, and sharing for EVSEs at one or more sites can be accessed in order to extract real-time, near-real time, and/or historical demand associated with the EVSEs, in order to generate demand components of the demand assessment.

In embodiments, one or more platforms can directly control load management and distribution for one or more EVSEs (e.g., via OCPP and/or other suitable protocols, such as protocols described herein, etc.), where controlling load management can include causing transitions in power output modes between 0 and the max capacity for one or more EVSEs at one or more sites. Load management data can then be accessed systems described herein (e.g., by application programming interfaces, by other means), in order to generate the demand assessment. In more detail, the method 100 can include programmatically controlling each EVSE, with detection of load for each EVSE, in relation to a maximum (e.g., maximum specified) load aggregated from the maximum load each EVSE can deliver. The method 100 can then allow controlling architecture (e.g., controller functionality of a system executing an application for EVSE control) to execute instructions for adjusting the electricity load delivered for each of the EVSEs (e.g., in real time).

In one variation of adjusting load delivery, the delivery output of each EVSE can be adjusted (e.g., throttled, increased, etc.) simultaneously (e.g., to the same percentage, to the same delivery rate, to provide the same total energy delivered, etc.). In one example, the system can determine a percentage by which delivery is throttled, based upon a ratio between an input constraint and a summation of the maximum load each EVSE can deliver (e.g., a collective maximum power output). For instance, the input constraint (e.g., 7 kW output) can be determined using controlling architecture (e.g., controller functionality of an application for managing distribution across a set of EVSEs), and for a set of EVSEs having a collective maximum power output (e.g., of 34 kW), the throttling percent can be determined as: input constraint/collective maximum power output=7 kW/34 kW~20%. In a related example, for a first EVSE having a first power output rating (e.g., 7 kW) and a second EVSE having a second power output rating (e.g., 10 kW), the throttling percent can be determined as: input constraint/collective maximum power output=7 kW/(7 kW+10 kW)~41%.

In related examples, the adjusted throttling amount can change in real time based upon traffic, based upon how many chargers are in use, and/or based upon other suitable factors. For instance, in the example above, for a first vehicle charging at the first EVSE and a second vehicle charging at the second EVSE, the first car will receive 7 kW*41% throttling amount=2.8 kW, and the second car will receive 10 kW*41% throttling amount=4.1 kW. Then, if the first vehicle terminates charging at the first EVSE but the second vehicle continues charging at the second EVSE, the second vehicle will receive 7 kW due to the input constraint of 7 kW.

Figure 4A:
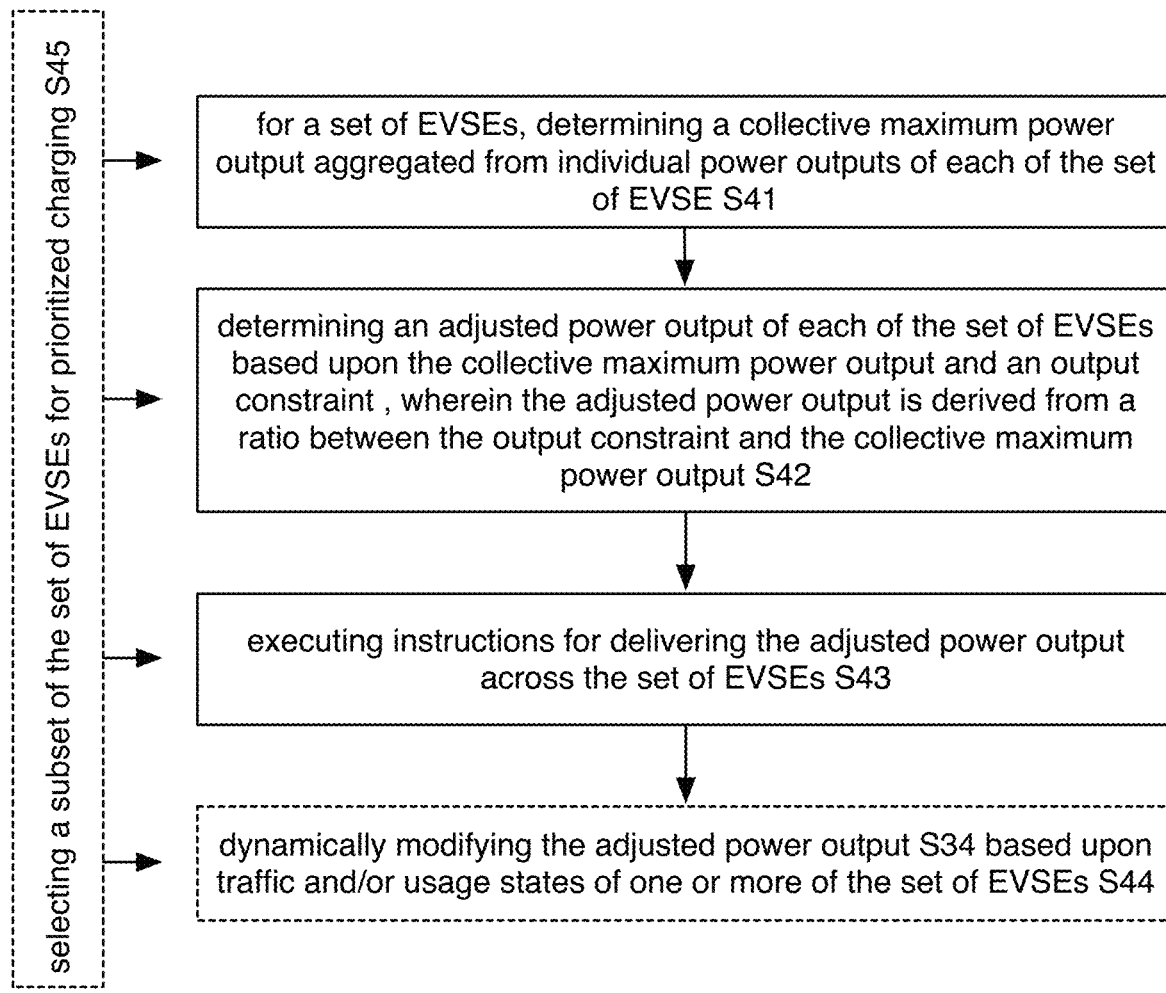

As such, as shown in FIG. 4A, the method 100 can include: for a set of EVSEs, determining a collective maximum power output aggregated from individual power outputs of each of the set of EVSE S41; determining an adjusted power output of each of the set of EVSEs based upon the collective maximum power output and an output constraint (e.g., an output constraint determined by an operator, a pre-determined output constraint, an output constraint determined based upon other factors described throughout this disclosure, etc.), wherein the adjusted power output is derived from a ratio between the output constraint and the collective maximum power output S42; and executing instructions for delivering the adjusted power output across the set of EVSEs S43 (e.g., in response to or in coordination with a set of reserved, ad hoc, and/or spontaneous charging sessions associated with the set of EVSEs). Executing instructions in relation to step S43 can include generating control instructions associated with implementation of the adjusted power output parameters across the set of EVSEs (or a subset of the EVSEs), where the control instructions can be stored in non-transitory media. Then, the system can execute the control instructions to perform one or more steps of the method 100. Additionally, the method 100 can include generating the EV demand component based upon the adjusted power output (e.g., modifying a demand assessment based upon actual load distribution and power output, in relation to charging device capacities).

In variations, the output constraint can be a limiting power output (e.g., a power output value less than or equal to the collective maximum power output), and the adjusted power output can be throttled by a percent determined from the ratio between the output constraint and the collective maximum power output. In variations, the method 100 can include dynamically modifying the adjusted power output S44 based upon traffic and/or usage states of one or more of the set of EVSEs (e.g., modifying the adjusted power output in response to at least one of increased occupancy of the set of EVSEs and decreased occupancy of the set of EVSEs). For instance, the adjusted power output can be re-determined upon initiation and/or termination of charging by a vehicle of a set of vehicles interacting with the set of EVSEs. In particular, the adjusted power output can be determined based upon the ratio: output constraint/sum(maximum delivery load$_i$), where i is an index for each EVSE undergoing a charging session.

In these variations, the EVSEs can be identical in terms of specified maximum power output and/or other characteristics, or can alternatively be non-identical in characteristics.

Figure 4B:
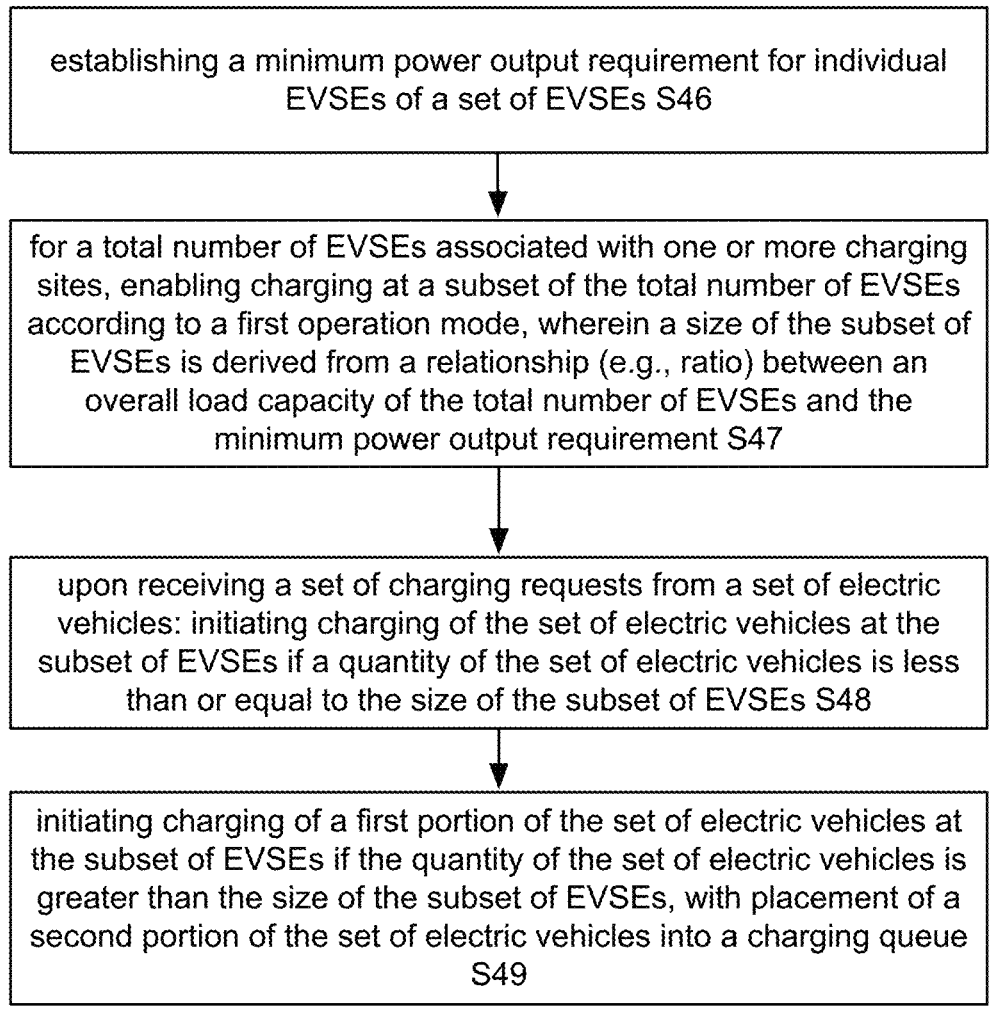

In a variation of the method 300 for condition-based power distribution, shown in FIG. 4B, the method 100 can include selecting a subset of the set of EVSEs for prioritized charging S45, and executing instructions for prioritizing charging of a set of vehicles through the subset of EVSEs, based upon a set of conditions S46. Selecting the subset of EVSEs for prioritized charging can be based upon distribution characteristics of the EVSEs (e.g., in relation to DC fast charging capability, in relation to other charging capabilities), location characteristics of the EVSEs (e.g., identification of geographic location characteristics of the EVSEs, in relation to remoteness, in relation to proximity to commercial areas, in relation to proximity to rural areas, in relation to proximity to residential areas, etc.), usage data for the EVSEs (e.g., prioritizing charging through heavily used EVSEs, in order to improve traffic flow, prioritizing charging through less-heavily-used EVSEs, in order to equalize maintenance requirements across the set of EVSEs), EVSE state characteristics (e.g., prioritizing charging through properly-operating EVSEs, etc.), EVSE connectivity states (e.g., prioritizing charging through EVSEs that are connected to a cloud-based platform, etc.), and/or other suitable characteristics. In variations where charging through a subset of EVSEs is prioritized, the method 300 can include stopping (e.g., temporarily stopping) charging through a non-prioritized subset of EVSEs, throttling charging through the non-prioritized subset of EVSEs (e.g., reducing load delivered through the non-prioritized subset of EVSEs relative to the prioritized subset of EVSEs), or otherwise postponing charging through the non-prioritized subset of EVSEs in another suitable manner.

Additionally or alternatively, variations of step S45 for condition-based power distribution can include selecting a subset of the set of EVSEs for prioritized charging based upon characteristics of the vehicles and/or users of vehicles intended to be charged. In one variation, users belonging to a particular user group can be prioritized, and, upon verification of such users, EVSEs selected for charging the vehicle(s) of the user(s) can be configured for prioritized. As such, the method 100 can include: at an EVSE, verifying an identify of a vehicle and/or user of a vehicle of a particular user group S46, and upon verification of the identity, configuring the EVSE (e.g., remotely configuring the EVSE, upon generation of control instructions for the EVSE) for prioritized charging of the vehicle at the EVSE S47. The particular group can be characterized by a common business entity (e.g., in relation to business affiliation, in relation to employment, in relation to business promotion, in relation to customer/vendor relationship, etc.), by a vehicle fleet, by an organization membership, by association with civil service operations (e.g., law enforcement operations, fire department operations, etc.), by association with healthcare/first response services (e.g., in relation to ambulance operations, etc.), by delivery entity or operation (e.g., in relation to package delivery services), or by another suitable grouping.

Additionally or alternatively, in relation to step S45, the subset of the set of EVSEs for prioritized charging can be selected based upon characteristics or states of the vehicles. Example characteristics can include vehicle charge state (e.g., state of charge below a threshold level of charge), vehicle state in relation to a mission (e.g., based upon an analysis of suitable charge state relative to an intended mission determined through a GPS route of the vehicle or destination of the vehicle determined in another manner), vehicle failure state, or other suitable vehicle state.

In relation to load management and distribution across a set of EVSEs, the system can enable implementation of scheduled load management controls, such that operating managers of the set of EVSEs can schedule various adjusted power output settings for one or more of the EVSEs.

Scheduling of adjusted power output settings can be based upon selection of particular time windows, based upon future events (e.g., triggering events, anticipating events), or based upon other factors. Scheduling functionality (e.g., of an application for managing EVSE operation) can be provided as part of a premium package/subscription or standard package/subscription.

In another example, as shown in FIGS. 4C and 4D, the method 100 can include steps for and implement system architecture for controlling load sharing and distribution across electric vehicles at a site (or set of sites) hosting a set of EVSEs, such that the output of each of the set of EVSEs never falls below a minimum output value (e.g., associated with a minimum charging rate). In more detail, with respect to a set of EVSEs (e.g., N total EVSEs), the system architecture can define a subset (e.g., M EVSEs) of the set of N EVSEs that are available for a first mode of charge distribution, and a second subset (e.g., N-M EVSEs) that are available in a charging queue (e.g., for a second mode of charge distribution). In embodiments, such a configuration for load sharing/distribution can provide improved load distribution and load sharing modes with respect to output power capabilities of the set of EVSEs. For instance, the methods described can be configured to avoid situations in which the set of EVSEs are subject to demand outside of the range of power they are capable (e.g., individually, collectively) able to provide. In one example use case, the methods described can mitigate situations in which the number of vehicles needing charging would collectively create demand that is outside the range(s) of output (e.g., in terms of current, in terms of voltage) that the set of EVSEs can provide. Furthermore, such a configuration can provide an improved user experience, by avoiding scenarios in which users wait within a queue for extensive or unnecessary amounts of time in order to charge their vehicle(s).

In a variation of the first operation mode, the M EVSEs can be configured to distribute an equal share of the available charging capacity to the electrical vehicles in communication with the M EVSEs, while additional users/electric vehicles are placed into the charging queue until a position becomes available amongst the M EVSEs (e.g., when an electric vehicle fully charges or leaves one of the M EVSEs). In this variation, the number M of the total N EVSEs can be determined by setting a minimum power output per EVSE/charging spot of the subset of M EVSEs, such that the power output is always above the lowest acceptable output of the range(s) of output each EVSE can provide. In an example, the minimum power output k can be set greater than a minimum output value (e.g., k≥1 kW), such that M is derived from the overall output capacity of the set of EVSEs divided by k (e.g., M=floor(C(overall load capacity)/k)). Additionally or alternatively, the number M of the total N EVSEs can be determined by setting M as any number as long as M≤N and C/M≥the minimum power output k.

In another variation of the first operation mode, each of the M EVSEs can be configured to distribute a non-equal share of the available charging capacity to the electrical vehicles in communication with the M EVSEs, as long as the power output from each of the subset of M EVSEs does not fall below a minimum power output (k) requirement. For instance, one or more of: traffic at the site associated with the set of EVSEs, non-uniform output capabilities of individual EVSEs of the set of EVSEs being used, non-uniform charging needs of vehicles interacting with the set of EVSEs (e.g., for different vehicles at different states of charge), or other factors.

As such, as shown in FIG. 4B, the method 300 can include steps for: establishing a minimum power output requirement for individual EVSEs of a set of EVSEs S46; for a total number of EVSEs associated with one or more charging sites, enabling charging at a subset of the total number of EVSEs according to a first operation mode, wherein a size of the subset of EVSEs is derived from a relationship (e.g., ratio) between an overall load capacity of the total number of EVSEs and the minimum power output requirement S47; upon receiving a set of charging requests from a set of electric vehicles: initiating charging of the set of electric vehicles at the subset of EVSEs if a quantity of the set of electric vehicles is less than or equal to the size of the subset of EVSEs S48; and initiating charging of a first portion of the set of electric vehicles at the subset of EVSEs if the quantity of the set of electric vehicles is greater than the size of the subset of EVSEs, with placement of a second portion of the set of electric vehicles into a charging queue S49.

FIG. 4C depicts a set of N total EVSEs, with M EVSE sites in a charging pool according to a first operation mode, and N-M EVSE sites in a second operation mode (e.g., as a charging queue). In this configuration, once vehicles at the M EVSE sites achieve a desired state of charge and/or leave the M EVSE sites, one or more EVSEs associated with the charging queue can be configured to transition to the first operation mode for charging an associated vehicle (i.e., thus removing the EVSE/vehicle from the charging queue). Furthermore, an EVSE previously in the charging pool that has completed charging of a vehicle can be transitioned to the second mode of operation (e.g., ready to accept a vehicle into the charging queue).

In variations, as shown in FIG. 4D, the method 100 can implement system architecture for prioritized load sharing based upon on vehicle need. For instance, in applications associated with load sharing based on vehicle need, the method 100 can include one or more of: detecting or receiving information pertaining to the state(s) of charge (SOC) of vehicles interfacing with the set of EVSEs S401 through vehicle integration or vehicle-to-grid communication interfaces (e.g., such as interfaces associated with ISO 15118 or another standard); and maintaining battery health and improving battery life for each of a set of vehicles interfacing with the set of EVSEs by setting the state(s) of charge of the set of vehicles to a desired level (e.g., x % charge) and/or at a desired rate of charge, and charging one or more of the set of vehicles to the desired level/at the desired rate S402. In one such variation, the need per vehicle (n) is thus x %-SOC, and the method 300 can include providing instructions for governing load sharing across the set of EVSEs by providing each of a set of M vehicles with charging parameters corresponding to $n_i/\text{sum}(n_1, \ldots n_M)$.

In relation to the above load management and distribution examples, the electric power distribution subsystem, in cooperation with controlling architecture, can operate at an appropriate scale (e.g., building scale, site scale, block scale, street scale, town scale, city scale, other geographic domain scale, etc.) in order to control energy load to devices and/or other apparatuses interfacing with the grid. As such, the system associated with load management and distribution can include structural and/or software architecture interfaces with the EMS, in order to allow load control ability (e.g., through an application with a corresponding application programming interface, API) of EVSEs.

In relation to demand components associated with EV fleet charging, as shown in FIG. 5A, a platform can receive or retrieve, for each electric vehicle of a group of electric vehicles in association with respective charging sessions: an arrival state of charge (SOC), an arrival time, a needed departure SOC, an actual departure SOC, and a departure time (e.g., actual departure time, intended departure time) S51. The platform can then categorize individual electric vehicles of the group of electric vehicles as belonging to a first subgroup having a first charging need (e.g., requiring charging), a second subgroup having a second charging need (e.g., requiring a small amount of charging), and a third subgroup having a third charging need (e.g., not requiring charging) upon determining a charging power needed by each vehicle in relation to a dwell time for each vehicle S52. The platform can then coordinate distribution of the group of electric vehicles across a set of EVSEs based upon at least one of power output capabilities of the set of EVSEs and availability of each of the set of EVSEs S53.

Retrieving arrival SOC and/or actual departure SOC information in Block S51 can include retrieving SOC data for each vehicle through vehicle integration or vehicle-to-grid communication interfaces (e.g., such as interfaces associated with ISO 15118 or another standard). Additionally or alternatively, the arrival SOC and/or actual departure SOC can be provided by a fleet manager, group manager, and/or other associated entity (e.g., through a management application supporting vehicle integration specifically for the fleet or group, through a management application providing API access to an overarching platform, controlling architecture, etc.). The needed departure SOC information can be retrieved by the overarching system by a fleet manager, group manager, and/or other associated entity (e.g., through manual input, through guidance based upon desire-able SOC values for maintaining and/or improving battery health, etc.). However, SOC values for each of the set of electric vehicles can be obtained in another suitable manner.

Categorizing individual electric vehicles of the group of electric vehicles in Block S52 can include determining the charging power (e.g., minimum charging power, average charging power, etc.) needed for each vehicle based upon dwell time and state of charge values for each of the set of vehicles. In one variation, charging power (P) can be determined based upon a relationship between arrival and departure states of charge and dwell time for each vehicle, where, in one example, $P=(SOC_{departure}-SOC_{arrival})/(time_{departure}-time_{arrive})$, where departure-related values are anticipated or intended departure values. However, other suitable relationships can be used to evaluate charging power needed for each electric vehicle.

In variations, the first subgroup having a first charging need can include electric vehicles for which the amount of charge needed is large relative to dwell time, such that the first subgroup includes vehicles needing charge. In variations, the second subgroup having a second charging need can include electric vehicles for which the amount of charge needed is small relative to dwell time (e.g., P<1 kW, etc.), such that the second subgroup includes vehicles not explicitly needing charge, or requesting a rate of charge smaller than a lower range of output power provided by one or more of the set of EVSEs. In variations, the third subgroup having a third charging need can include electric vehicles for which the amount of charge needed is small relative to dwell time (e.g., arrival SOC≥needed departure SOC), such that the third subgroup includes vehicles not needing charge. As such, the second subgroup can be categorized as filler vehicles, and the third subgroup can be categorized as optional vehicles. While subgroups of charging requirements are described, Block S52 can alternatively include determining a distribution of charging needs based upon charging power needed and dwell time for each electric vehicle, without categorization of the electric vehicles into discrete subgroups.

An example of distribution of the group of electric vehicles across the set of EVSEs according to Block S53 is shown in FIG. 5B, where each electric vehicle of the group/fleet is categorized and tagged with a location identifier (e.g., of a particular EVSE at a site), arrival time, arrival SOC, departure time, needed departure SOC, and actual departure SOC (e.g., v1(location_id, arrival_time, arrival_soc, departure_time, departure_needed_soc, departure_actual_soc), v2( . . . ), vn( . . . )). In one variation of distribution of the group of electric vehicles across the set of EVSEs, Block S53 can include prioritizing use of the lowest powered charger suitable for each electric vehicle, such that the set of electric vehicles is distributed across the set of EVSEs according to minimum output power associated with each of the set of EVSEs. With more granularity, in a specific example, if P for v1 is 3 kW, and a first EVSE is a level 2 charger at 7.4 kW and a second EVSE is a DCFC at 25 kW, the method coordinates charging of v1 at the level 2 EVSE, which is suitable for the charging needs of v1. As such, the 25 kW DCFC EVSE is reserved for other electric vehicles of the group/fleet having with larger charging needs or dynamic events.

FIG. 5B depicts an arrangement of vehicles (v1 through v7) across axis constraints of load and time, respectively, for a set of EVSEs at a site, where the EVSEs individually have different output power capabilities, and where the set of EVSEs collectively has a limiting load capacity. Vehicles v1, v2, v3, v6, and v7 are distributed across the set of EVSEs, where the heights of blocks corresponding to the vehicles indicates load required (e.g., based upon power calculations determined from states of charge and dwell time, as described above). As shown in FIG. 9B, vehicles v1, v2, v3, v6, and v7 can be distributed across EVSEs based upon power needs compared to output power limitations of the EVSEs. Then, in relation to vehicle v4, which has a P value less than a threshold value (e.g., 1 kW) and a specified arrival time and a specified departure time, v4 can serve as a filler vehicle and occupy EVSE sites in a manner that does not conflict with charging requirements of the other vehicles needing charge. In relation to FIG. 5B, the method can guide charging of v4 as a filler vehicle, according to logic, the logic is configured to identify a minimum in the dwell time of a filler vehicle, and then fill a suitable time window at an EVSE until the vehicle no longer has the minimum dwell time. Then, if the filler vehicle still requires charging (but below a threshold level), then the logic can be implemented again for the same or a different available EVSE. Filler logic can, however, be implemented in another suitable manner.

FIG. 5B depicts an example whereby the number of vehicles of a group/fleet is less than or equal to the number of EVSEs at one or more charging sites, such that there are no conflicts arising due to a limited number of EVSEs. However, variations of the example shown in FIG. 9B can cover scenarios whereby the number of vehicles of a group/fleet is greater than the number of EVSEs at one or more charging sites. For instance, in such variations, the method can include prioritization of vehicles according to a ranking of charging needs, and guiding positioning of the vehicles at the EVSEs based upon the ranking, with lower priority vehicles positioned into a charging queue. Then, with satisfaction of a charging parameter (e.g., SOC-derived parameter) for the vehicles initially with higher priority, the method can include moving (e.g., by an operator, by an autonomous driving/parking subsystem) one or more vehicles satisfying their charging parameter from its corresponding EVSE such that a lower priority vehicle can now charge at the EVSE. However, variations of the method can be implemented in another suitable manner.

Variations of the method shown in FIGS. 5A and 5B, can further apply to other groups of electric vehicles (e.g., non-fleet groups). Furthermore, the method can be implemented with a subset of the group of features comprising: an arrival state of charge (SOC), an arrival time, a needed departure SOC, an actual departure SOC, and a departure time. Additionally or alternatively, the method can be implemented with additional features beyond that described above.

Embodiments, variations, and examples of assessing EV demand based upon operation and management of EVSEs are further provided in one or more of: U.S. application Ser. No. 17/163,638 filed on 1 Feb. 2021 and U.S. application Ser. No. 16/983,175 filed on 3 Aug. 2020, each of which is incorporated herein in its entirety by this reference.

3.2.2 IOT Demand Based Upon Processing of IOT and Other Device Signatures

In variations, generating the IOT demand component can include assessing anticipated or actual IOT device usage at a location and time. In one embodiment, accessing meter information (e.g., by coupling with conduits associated with electrical meters, by coupling with conduits between electrical meters and breakers) and/or detecting electrical signals indicative of device/appliance usage at a property can be used to generate the IOT demand component at the level of the entire property and/or for individual devices/appliances. As such, the IOT demand component can be generated in real-time or near-real-time, and/or for anticipated future time points based upon machine learning models for detecting operation of and patterns of demand by individual devices and appliances.

In one variation, processing detected electrical signals can include applying transformation operations to said signals, in order to characterize patterns and signatures of individual devices and appliances. Transformation operations can include a disaggregation operation that implements artificial intelligence neural networks (NN) models, to ultimately identify data subsets derived from the electrical signals, and unique signatures corresponding to events/statuses of individual devices and appliances. In embodiments, processing architecture can run a single NN or a series of NN trained to identify and classify signatures of appliance/device usage in relation to times and events (e.g., historical events, anticipated events, etc.), at device/appliance levels of resolution and at a global/property level of resolution. As such, the set of transformation operations can take, as inputs, data derived from the signal streams and process them with trained AI/NN models for returning unique signatures associated with individual devices/appliances at each property of interest.

The set of transformation operations can include a disaggregation operation that implements a recurrent neural network (RNN) architecture with connections between nodes to form a directed graph along a temporal sequence, thereby characterizing temporal dynamic behavior associated with the electrical signals. The RNN can be bi-directional or of any suitable number of directions, with one or more encoders, separators, and decoders. The RNN architecture can process variable length sequences of inputs, thereby processing the signal streams and/or derived features above. The RNN can implement long short-term memory (LSTM) architecture with feedback connections for processing data sequences. The LSTM unit(s) of the RNN model can include cells, input gates, output gates, and/or forget gates to regulate information flow into and out of the cell. As such, the LSTM RNN architecture can classify, process, and make predictions based on input features derived from the signals described above. Connections into and out of the LSTM gate(s) can be recurrent or non-recurrent, and weights of connections can be refined during training to determine how the gates operate in providing better outputs. Training can implement supervised training approaches or non-supervised approaches, discussed in further detail in Section 3.2.3 below.

In one variation, the disaggregation operation can implement multiple sub-models, where each sub-model corresponds to a number of input components associated with the demand events and/or time points of interest. The disaggregation model can be configured to implement the appropriate sub-model based upon prior knowledge of the devices/appliances being analyzed, or alternatively, can be configured to automatically detect the number of devices/appliances being analyzed with an estimation algorithm applied. The disaggregation model can be optimized based upon signal-to-noise ratio (SNR)-associated parameters (e.g., a scale-invariant SNR), using one or more loss functions and permutation-invariant training. In one variation of model architecture, a loss function with suitable loss terms can be inserted adjacent to each separation block of the disaggregation model in order to improve optimization of the disaggregation model. The model can additionally or alternatively include a perceptual loss function to encourage consistent mapping of subcomponents and/or subcomponent-associated events. Other approaches (e.g., RNN approaches derived from one or more of ADANet, DPCL++, CBLDNN_GAT, TasNet, DPRNN, ConvTasNet, etc.) and training methods can be implemented, as described below.

Returned classification outputs of models can include returned confidence-associated parameters in such classifications. In particular, confidence-associated parameters can have a score (e.g., percentile, other score) that indicates confidence in the returned output.

The set of transformation operations can additionally or alternatively include operations associated with signal conditioning, noise removal, artifact mitigation, calibration, or other signal processing operations. Such operations can ensure signal stream quality prior to further processing in various method steps. In some variations, preprocessing the signal streams can include performing one or more steps to verify completeness of data.

Figure 6:
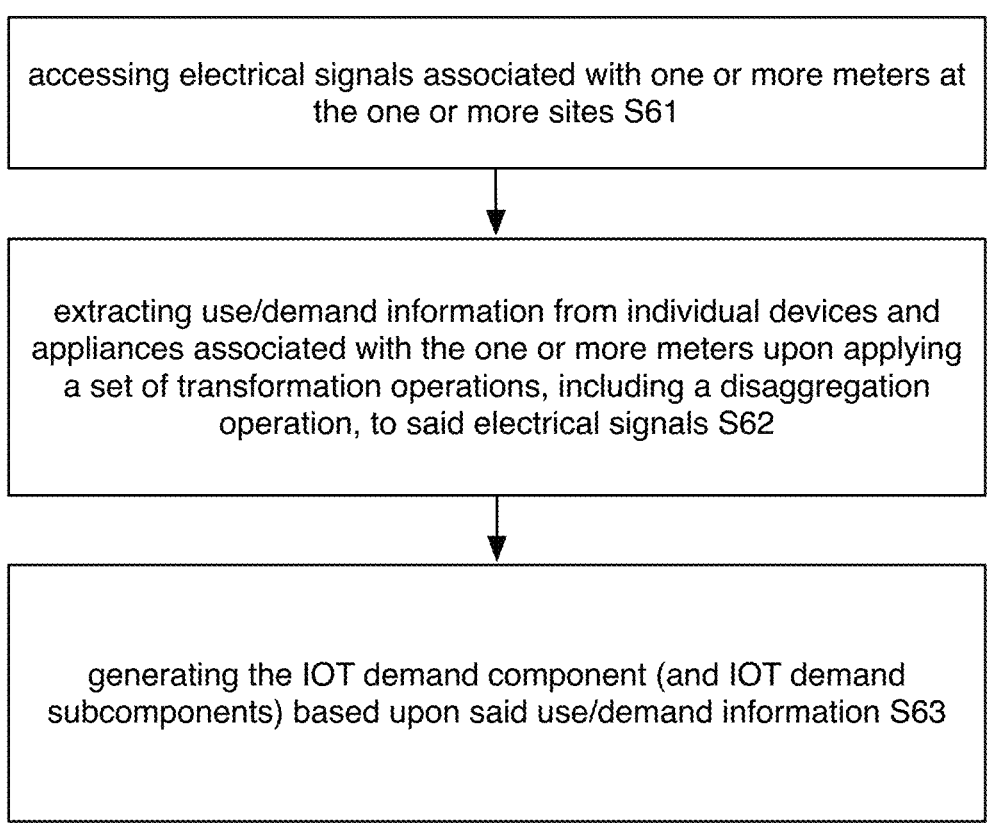
FIG. 6 depicts an embodiment of a method for generating IOT and other device/appliance demand components based upon electrical signal signatures.

As such, as shown in FIG. 6, the method 100 can include: accessing electrical signals associated with one or more meters at the one or more sites S61, extracting use/demand information from individual devices and appliances associated with the one or more meters upon applying a set of transformation operations, including a disaggregation operation, to said electrical signals S62, and generating the IOT demand component (and IOT demand subcomponents) based upon said use/demand information S63.

3.2.3 Demand Modeling and Refinement

In some variations, as shown in FIG. 1B, the method 100 can further include refining the demand model S150, wherein refining the demand model includes: collecting a set of training data streams derived from historical demand upon the electric power distribution system, the set of training data streams capturing demand by a population and a contextual dataset S151, applying a set of transformation operations to the set of training data streams S152, creating a training dataset derived from the set of training data streams and the set of transformation operations S153, and training the demand model (comprising architecture for returning demand assessment) in one or more stages, based upon the training dataset S154.

In relation to collecting the set of training data streams in Step S151, the set of training data streams can be derived from historical IOT device demand upon the electric power distribution system across the set of set of non-regulated and non-standard protocols, and historical EV demand upon the electric power distribution system with the regulated and standard protocol. The set of training data streams can capture demand by a population and a contextual information comprising a set of locations and a set of times, where the set of locations can overlap with the set of sites and/or set of outlets of interest in relation to generation of the demand assessment. However, the set of locations and the set of times, can alternatively not overlap with the set of sites and/or set of outlets of interest.

Furthermore, the set of training data streams can encode signatures of usage for individual devices, appliances, EVSEs, and/or other equipment subject to each of the set of set of non-regulated and non-standard protocols, or regulated and standard protocols, and extracted from respective application programming interfaces, and wherein applying the set of transformation operations comprises processing said signatures at the set of locations and the set of times.

Data/signal inputs indicated above and/or other inputs (e.g., contextual inputs, derivative inputs, combinatorial inputs, etc.) can be used for training the demand model. In more detail, features may be transformed either individually or in combination before being processed by the model(s).

In relation to model architecture, inputs to models described above can produce outputs that are subsequently used as inputs to an overarching model (e.g., search graph) that returns the demand assessment (e.g., with one or more final classification outputs categorizing demand in relation to time windows, groups/cohorts, etc.) based upon processing features in stages. However, the model(s) can implement other suitable architecture having other suitable flow for processing features derived from the inputs.

Returned classification outputs of models can include returned confidence-associated parameters in such classifications. In particular, confidence-associated parameters can have a score (e.g., percentile, other score) that indicates confidence in the returned output.

Furthermore, refined versions of the model can be configured to process fewer inputs (e.g., only a subset of inputs described above) in order to return accurate demand assessments for guiding actions associated with Step S130. Furthermore, previously features derived from inputs (e.g., new signals/signatures, interesting signals/signatures, etc.) can be returned by computing components during model refinement.

While embodiments, variations, and examples of models (e.g., in relation to inputs, outputs, and training) are described above, models associated with the method 100 can additionally or alternatively include other machine learning architecture.

Statistical analyses and/or machine learning algorithm(s) can be characterized by a learning style including any one or more of: supervised learning (e.g., using back propagation neural networks), unsupervised learning (e.g., K-means clustering), semi-supervised learning, reinforcement learning (e.g., using a Q-learning algorithm, using temporal difference learning, etc.), and any other suitable learning style.

Furthermore, any algorithm(s) can implement any one or more of: a regression algorithm, an instance-based method (e.g., k-nearest neighbor, learning vector quantization, self-organizing map, etc.), a regularization method, a decision tree learning method (e.g., classification and regression tree, chi-squared approach, random forest approach, multivariate adaptive approach, gradient boosting machine approach, etc.), a Bayesian method (e.g., naïve Bayes, Bayesian belief network, etc.), a kernel method (e.g., a support vector machine, a linear discriminate analysis, etc.), a clustering method (e.g., k-means clustering), an associated rule learning algorithm (e.g., an Apriori algorithm), an artificial neural network model (e.g., a back-propagation method, a Hopfield network method, a learning vector quantization method, etc.), a deep learning algorithm (e.g., a Boltzmann machine, a convolution network method, a stacked auto-encoder method, etc.), a dimensionality reduction method (e.g., principal component analysis, partial least squares regression, etc.), an ensemble method (e.g., boosting, boot strapped aggregation, gradient boosting machine approach, etc.), and any suitable form of algorithm.

3.3 Method—Demand Event Responses

Block S130 recites: executing an action for adjustment of load distribution through the controlling architecture or other management entity, based upon the demand assessment. Block S130 functions to guide and/or execute re-distribution of load (e.g., in relation to time, in relation to geographic location, etc.) and/or load shedding, in order to properly respond to demand events and reduce impact on existing infrastructure. Actions executed by Block S130 can further function to reduce or eliminate carbon emissions associated with the power distribution system and/or during specific time windows. The demand events can be predicted by model outputs of Block S120 and/or alternatively selected by manual input.

In embodiments, actions for shifting load/energy output can include: load shedding (e.g., executing instructions for shedding a portion of load used at a subset of the set of outlets, through the controlling architecture), whereby utilities and/or aggregators can request a certain amount of load to be shed/reduced (e.g., a percentage of load, a total amount of load, etc.). The management entity can thus be provided with tools, through the interface with controlling architecture, in order to shed load or incentivize an end user to reduce load used. Executing the action can include providing the management entity with the option to not respond to a request, to respond to a request in a manual manner (e.g., subject to each event, the management entity can respond to the event and offer the load shed amount desired at that moment), to respond to the request in a default or automatic manner (e.g., the management entity can opt to consistently shed a set load amount, or a set profile of load shedding), and/or to pass decision-making onto the end user (e.g., a driver of an electric vehicle, a property owner using power for various devices, a property manager, etc.). In examples, passing decision-making to the end user can include providing the end user with the option to pay a first rate (e.g., higher rate) to receive power at a desired rate of output, or to pay a second rate (e.g., a pre-selected baseline rate) to receive power at a less-desired rate of output. The end user can, however, be incentivized in another manner (e.g., incentivized with a reward to resume charging at a different time when demand is less high).

Additionally or alternatively, in embodiments, actions for shifting load can include: implementation of or applying time-of-use (TOU) pricing (e.g., executing instructions for applying time-of-use pricing with an increase in price of electricity used during a period of high demand, based upon the demand assessment), which implements different electricity pricing rates to incentivize shifting certain tasks to low demand times. In an example, TOU pricing can include a first price per unit power output (e.g., $0.06/kWh, other rate) during a first demand event (e.g., time window from 9 pm to 6 am, another time window), and a second price per unit power output (e.g., $0.28/kWh) during a second demand event (e.g., during peak hours from 6 pm to 9 pm). As such, executing the action can include executing instructions for applying time-of-use pricing (e.g., with an increase in price of electricity used during a period of high demand based upon the demand assessment, with a decrease in price of electricity used during a period of low demand based upon the demand assessment).

In variations, executing the action can include providing proposed guidance to the management entity, in order to coordinate load shedding and/or incentivize end users to reduce usage in association with a demand event. In variations, the executed action can involve one or more of: setting plug-in fees per session; setting session caps; setting fixed pricing parameters per unit energy; setting tiered pricing parameters per unit energy; setting fixed pricing parameters per unit time; setting tiered pricing parameters per unit time; setting, adding, or deleting time of use exemptions; controlling scheduling of demand events and associated load shedding; defining groups/cohorts (e.g., by location, by type, by another factor, etc.) subject to different load shedding priorities; controlling load reduction states (e.g., to a percentage of a baseline load, by a certain amount, to another suitable level, etc.); determining time-of-use pricing according to a set of time windows; and responding to requests (e.g., by a utility experiencing a demand event).

Executed actions can further include notifying end users of demand events (e.g., associated with a time window, associated with a geographic location, associated with an event or disaster, associated with a site hosting chargers or other suitable location, etc.). As such, executing the action can include generating notifications for end-users associated with the set of outlets and the set of sites, said notifications informing said end-users of anticipated load adjustments for a demand event, the demand event associated with a natural disaster, and said notifications provided through a set of client mobile devices of said end-users.

Executed actions can be tailored to different cohorts (e.g., residential, electric vehicle-associated, electric aircraft-associated, user role, commercial, industrial, etc.) as described above, where each group/cohort can have different specified load shedding limits in relation to priority of the cohort and ability for the cohort to still operate in a desired manner.

Executed actions can include automatically shutting off or reducing power to one or more cohorts (e.g., low priority cohorts), through connections to the power distribution subsystem.

Additionally or alternatively, executed actions can include providing operation modes for entities to deliver stored energy (e.g., energy stored in batteries) back to the grid. For instance, in some variations, the system can include architecture and structures for EVs or other devices/apparatuses to push energy stored in their batteries back onto the grid. Executed actions can thus include coordinating operation modes (e.g., through application interfaces, through charging infrastructure, through management tools, through interfaces with the utilities, etc.) in which entities (e.g., a secondary market of energy sellers, such as fleet managers) can deliver energy back to the grid. In variations, such entities can offer their own electricity rates or otherwise benefit from delivery of energy to the grid. In one such example, large fleets can store energy within vehicle batteries during low demand times (e.g., off-duty and low utility rate times), from utilities or renewable energy producers that have extra energy that they want to sell. The interface and associated architecture can then enable responses to requests or offers to EVs/operators either charge up in their own charging depots or the renewable energy producer's micro/nano grid. Then during high demand times (e.g., peak hours, grid stress times, etc.), the EVs/operators can be incentivized to offer their energy back for a benefit/reward. As such, executing the action can include enabling retrieval of an amount of stored energy from batteries of a set of electric vehicles to the electric power distribution system, and providing a reward to end-users associated with the set of electric vehicles, upon receipt of the amount of stored energy. As such executed actions can incentivize independent entities to contribute to available output, to mitigate effects of high demand.

In relation to delivery of stored energy from EVs or other devices/apparatuses to the electric power distribution system, executing the action can be performed with satisfaction of requirements of battery-to-grid (e.g., EV battery-to-grid, appliance battery-to-grid, etc.) electrical code limitations. Pushing stored energy from batteries to the electric power distribution system can be performed with code-compliant devices (e.g., an intermediate device between the EV, device, or appliance and an outlet), where the code-compliant devices condition electricity received from said batteries in a code-compliant manner, and transmit said conditioned electricity to the electric power distribution system.

In one example application, executing the action can include incentivizing end-users to charge devices/appliances/EVs during low-demand periods or periods where clean electricity can be generated (e.g., daytime periods where solar and/or wind generation are high), and to deliver stored energy to the electric power distribution system during high-demand periods. In one specific use case, end users can be incentivized (e.g., through rewards provided through client devices of end-users) to commute to work or another location by EV where the EV can be charged (or to otherwise leave the EV at a residential location for daytime charging during low-demand periods or periods where clean electricity can be generated. Then, the end users can be incentivized to deliver stored energy from said EV and/or other devices or appliances to the electric power distribution system during periods of high demand or when clean energy is difficult to generate (e.g., evening hours). In this scenario, delivery of stored energy can be performed in a manner that allows the end-user to have enough remaining charge for the EV, such that the end-user can operate the EV the next day without disruption. In such embodiments, the end-user can provide inputs that apply further constraints to the amount of stored energy delivered to the electric power distribution system (e.g., based upon schedule of events for the following day(s), etc.). Additionally or alternatively, the amount of energy delivered from the end-user's EV/appliances/devices can be determined based upon patterns of behavior of the user (e.g., extracted from applications or client devices of the user).

Example interfaces supporting executed actions described are shown in FIGS. 2A-2D.

The method 100 can, however, include other suitable steps to promote proper load distribution in response to various events.

4. System

Figure 7A:
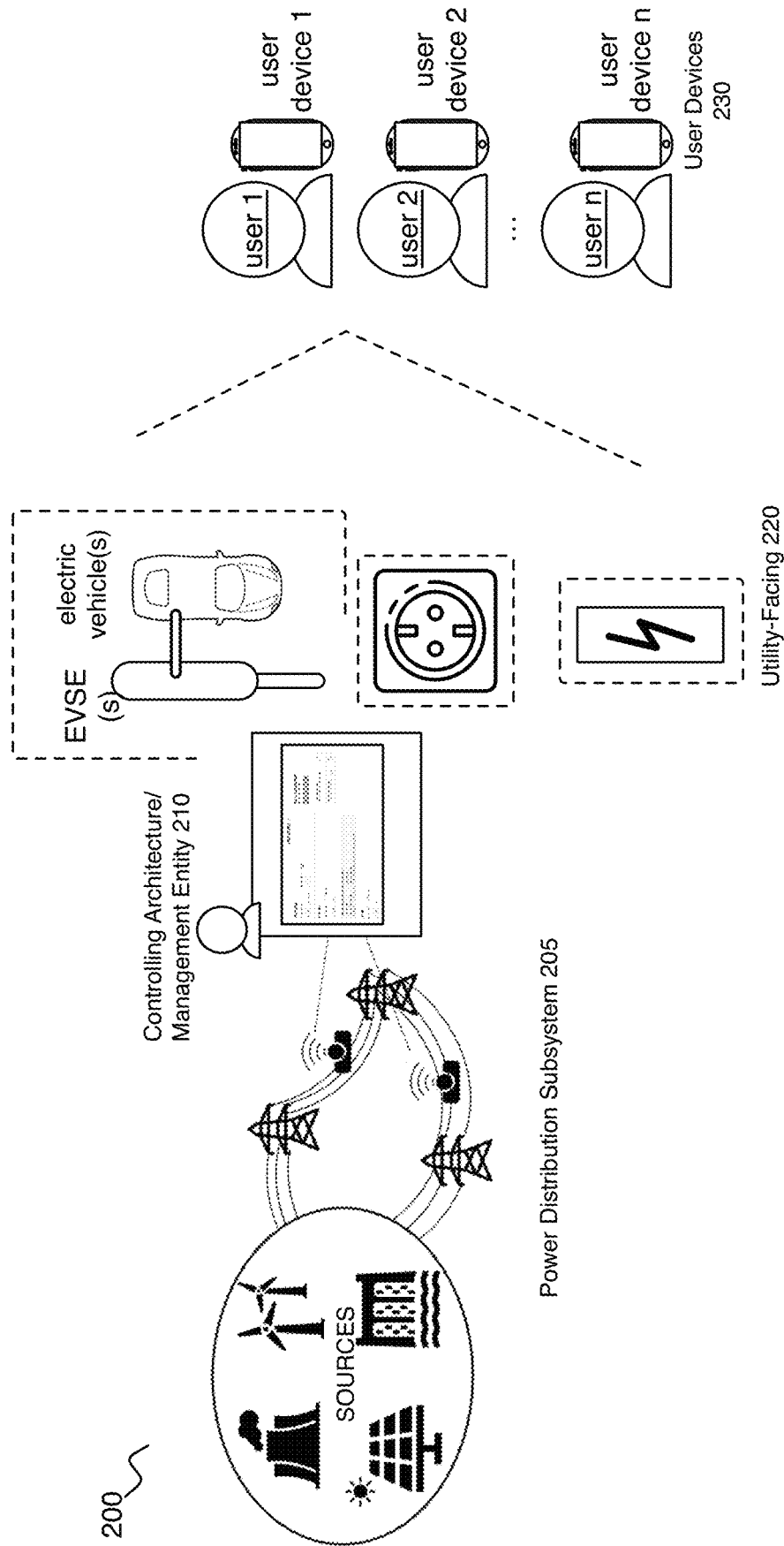
FIGS. 7A-7B depict schematics of an embodiment of a system for load distribution.
Figure 7B:
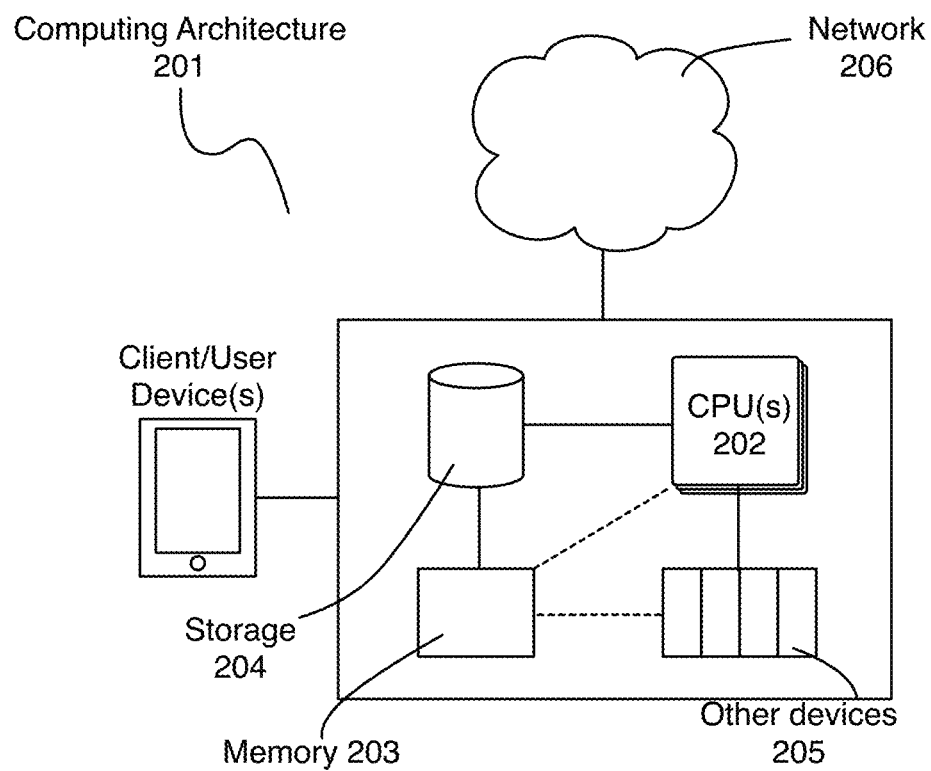

As shown in FIGS. 7A and 7B, an embodiment of a system 200 for load distribution includes: an interface for a controlling architecture (e.g., management entity) 210 of a power distribution system 205, the power distribution system in communication with a set of outlets of utility-facing devices 220 providing access to the electric power distribution system. The management entity 210 can also be in communication with a set of user devices 230 of users requiring power from the power distribution system 205, the user devices 230 including devices for executing an application configured to facilitate receiving load/conducting charging sessions with the utility-facing devices 220.

The system 200 functions to execute methods 100 described in Section 3 above; however, the system 200 can additionally or alternatively function to execute other suitable methods. As such, the system 200 can include computing architecture with non-transitory media storing computer-readable instructions, that when executed by the computing architecture execute one or more steps of the method(s) described above.

As such, the system 200 can include computing architecture 201, as shown in FIG. 7B, that is programmed to implement methods described.

The computing architecture 201 can include an electronic device/client device of a user or a computer system that is remotely located and/or operated. The electronic device can be a mobile electronic device.

The computing architecture 201 can include one or more central processing units 202, which can be single core, multi core, or a plurality of processors for parallel processing. The computing architecture 201 can also include memory 203 (e.g., random-access memory, read-only memory, flash memory), storage 204 (e.g., hard disk), communication interface 1120 (e.g., network adapter) for communicating with one or more other systems, and other devices 205, such as cache, other memory, data storage and/or electronic display adapters. The memory 203, storage 204, and/or other devices 205 are in communication with the central processing unit(s) 202 through a bus. The storage 204 can be a data storage unit (or data repository) for storing data. The computing architecture 201 can be operatively coupled to a network 206. The network 1130 can be the Internet, an internet and/or extranet, or an intranet and/or extranet that is in communication with the Internet.

In some embodiments, the network 206 is a telecommunication and/or data network. The network 206 can include one or more computer servers, which can enable distributed computing, such as cloud computing. Such cloud computing may be provided by cloud computing platforms such as, for example, Amazon Web Services (AWS), Microsoft Azure, Google Cloud Platform, and IBM cloud. In some embodiments, the network 206, with the aid of the computer system 1101, can implement a peer-to-peer network, which may enable devices coupled to the computer system 101 to behave as a client or a server.

The CPU(s) 202 can include one or more computer processors and/or one or more graphics processing units (GPUs). The CPU(s) 202 can execute a sequence of machine-readable instructions, which can be embodied in a program or software. The instructions may be stored in a memory location, such as the memory 203. The instructions can be directed to the CPU(s) 202, which can subsequently program or otherwise configure the CPU(s) 202 to implement methods of the present disclosure.

The computing architecture 201 can communicate with one or more remote computer systems through the network 206. For instance, the computing architecture 201 can communicate with a remote computer system of a user.

Methods as described herein can be implemented by way of machine (e.g., computer processor) executable code stored on an electronic storage location of the computing architecture 201, such as, for example, on the memory 203 or storage 204. The machine executable or machine-readable code can be provided in the form of software. During use, the code can be executed by the computing architecture 201. In some embodiments, the code can be retrieved from the storage 204 and stored on the memory 203. In some situations, the storage 204 can be precluded, and machine-executable instructions are stored on memory 203.

Embodiments of the systems and methods provided herein, such as the computing architecture 201, can be embodied in programming architecture. Various aspects of the technology are thus "products" or "articles of manufacture" in the form of machine executable code and/or associated data that is carried on or embodied in a type of machine readable medium. As used herein, unless restricted to non-transitory, tangible "storage" media, terms such as computer or machine "readable medium" refer to any medium that participates in providing instructions to a processor for execution.

Embodiments, variations, and examples of system elements are further described in one or more of: U.S. patent application Ser. No. 16/983,175 filed on Aug. 3, 2020, and U.S. patent application Ser. No. 17/163,638 filed on Feb. 1, 2021, each of which is incorporated herein in its entirety by this reference.

The system 100 can, however, include other suitable elements configured to promote proper operation of the cable 110 and/or facilitate performance of secure charging sessions in another suitable manner.

5. Conclusion

Embodiments of the invention(s) described can include every combination and permutation of the various system components and the various method processes, including any variants (e.g., embodiments, variations, examples, specific examples, figures, etc.), where portions of embodiments of the method 100 and/or processes described herein can be performed asynchronously (e.g., sequentially), concurrently (e.g., in parallel), or in any other suitable order by and/or using one or more instances, elements, components of, and/or other aspects of the system 200 and/or other entities described herein.

Any of the variants described herein (e.g., embodiments, variations, examples, specific examples, figures, etc.) and/or any portion of the variants described herein can be additionally or alternatively combined, aggregated, excluded, used, performed serially, performed in parallel, and/or otherwise applied.

Portions of embodiments of the invention(s) can be embodied and/or implemented at least in part as a machine configured to receive a computer-readable medium storing computer-readable instructions. The instructions can be executed by computer-executable components that can be integrated with embodiments of the system(s). The computer-readable medium can be stored on any suitable computer-readable media such as RAMs, ROMs, flash memory, EEPROMs, optical devices (CD or DVD), hard drives, floppy drives, or any suitable device. The computer-executable component can be a general or application specific processor, but any suitable dedicated hardware or hardware/firmware combination device can alternatively or additionally execute the instructions.

As a person skilled in the art will recognize from the previous detailed description and from the figures and claims, modifications and changes can be made to embodiments of the methods, systems, and/or variants without departing from the scope defined in the claims. Variants described herein not meant to be restrictive. Certain features included in the drawings may be exaggerated in size, and other features may be omitted for clarity and should not be restrictive. The figures are not necessarily to scale. The absolute or relative dimensions or proportions may vary. Section titles herein are used for organizational convenience and are not meant to be restrictive. The description of any variant is not necessarily limited to any section of this specification.

What is claimed is:

1. A method for load distribution, the method comprising:
establishing an interface with a controlling architecture of an electric power distribution system, the electric power distribution system in communication with a set of outlets of utility-facing devices providing access to the electric power distribution system;
returning a demand assessment from a demand model characterizing anticipated demand upon the one or more portions of the electric power distribution associated with the set of outlets, the set of outlets positioned at a set of sites
wherein returning the demand assessment comprises processing a set of inputs with the demand model, wherein the set of inputs comprises a time input with time of a demand event, a geographic input, a grid-sector input, a climate event input, an infrastructure event, and a source input pertaining to green and non-green sources of power generation,
wherein the demand assessment comprises an internet-of-things (IOT) demand component extracted using an application programming interface, and an electric vehicle (EV) demand component extracted using a regulated and standard protocol with cloud control subsystems,
wherein the EV demand component characterizes anticipated usage at the set of sites and a time, and generating the EV demand component comprises:
providing the set of sites and the time as inputs to the demand model and extracting anticipated EV demand subcomponents characterizing anticipated demand at a set of EV charging devices at the set of sites and the time,
determining a collective maximum power output aggregated from individual power outputs of the set of EV charging devices,
determining an adjusted power output of each of the set of EV charging devices based upon the collective maximum power output and an output constraint, wherein determining the adjusted power output comprises deriving the output constraint,
executing instructions for delivering the adjusted power output across the set of EV charging devices in coordination with a set of charging sessions associated with a set of electric vehicles and the set of EV charging devices, and generating the EV demand component based upon the adjusted power output; and
executing an action for adjustment of load distribution throughout the set of sites, through the controlling architecture, based upon the demand assessment.

2. The method of claim 1, wherein the electric power distribution system comprises a decentralized portion and a centralized portion, and wherein the decentralized portion is dominant over the centralized portion.

3. The method of claim 1, wherein the controlling architecture is associated with a management entity of the electric power distribution system, and wherein the interface comprises a first subset of digital elements encoding information pertaining to load and demand characteristics at the set of sites, wherein said information comprises: utility pricing, available exemption categories, demand-associated event information, historical achievements in load distribution and load shedding, and information regarding groups of end-users with different load distribution and shedding requirements.

4. The method of claim 3, wherein the interface comprises a second subset of objects comprising adjustable controls for controlling transitions of the electric power distribution system between a set of load distribution operation modes, and wherein the method further comprises:
receiving an input by the management entity, and transitioning the electric power distribution system between a first load distribution operation mode and a second load distribution operation mode of the set of load distribution operation modes.

5. The method of claim 4, wherein the second subset of objects comprises objects responsive to inputs for: setting plug-in fees per charging session, setting charging session time limits, setting pricing parameters per unit energy, adjusting time-of-use exemptions, controlling scheduling of demand events and associated load shedding, and responding to requests with a set of response types.

6. The method of claim 5, wherein the set of response types comprises a first response type that allows the management entity to not respond to a request, a second response type that allows the management entity to respond to the request in a manual manner, a third response type that allows the management entity to respond to the request in a default manner, and a fourth response type that allows the management entity to pass decision-making onto an end-user associated with one of the set of outlets.

7. The method of claim 1, wherein said utility-facing devices comprise electric vehicle supply equipment (EVSE) units, commercial property outlets, and residential property outlets.

8. The method of claim 1, wherein the set of inputs comprises inputs generated by one or more measurement devices associated with, electric vehicles, electronic devices, and utility-facing devices, wherein the set of inputs comprises signal streams generated and transmitted by said one or more measurement devices.

9. The method of claim 1, wherein the IOT demand component characterizes anticipated IOT device usage at a location and a time, the method further comprising: providing the location and the time as inputs to the demand model, and extracting anticipated IOT demand subcomponents characterizing anticipated demand for a set of devices, at the location and the time.

10. The method of claim 9, wherein said IOT demand subcomponents characterize anticipated IOT demand for the set of devices individually, and for one or more properties associated with the set of sites.

11. The method of claim 1, further comprising refining the demand model and return of the IOT demand component and the EV demand component with the demand assessment, wherein refining the demand model comprises:
collecting a set of training data streams derived from:

historical IOT device demand upon the electric power distribution system, and historical EV demand upon the electric power distribution system with the regulated and standard protocol, wherein the set of training data streams captures demand by a population and a contextual information comprising a set of locations and a set of times;

applying a set of transformation operations to the set of training data streams;

creating a training dataset derived from the set of training data streams and the set of transformation operations, and training the demand model in a set of stages, based upon the training dataset.

12. The method of claim 11, wherein the set of training data streams encode signatures of usage for individual IOT devices are extracted from respective application programming interfaces, and wherein applying the set of transformation operations comprises processing said signatures at the set of locations and the set of times.

13. The method of claim 1, wherein executing the action comprises executing instructions for shedding a portion of load used at a subset of the set of outlets, through the controlling architecture.

14. The method of claim 1, wherein executing the action comprises executing instructions for applying time-of-use pricing with an increase in price of electricity used during a period of high demand, based upon the demand assessment.

15. The method of claim 1, wherein executing the action comprises generating notifications for end-users associated with the set of outlets and the set of sites, said notifications informing said end-users of anticipated load adjustments for a demand event, the demand event associated with a natural disaster, and said notifications provided through a set of client mobile devices of said end-users.

16. The method of claim 1, wherein executing the action comprises enabling retrieval of an amount of stored energy from batteries of a set of electric vehicles to the electric power distribution system, and providing a reward to end-users associated with the set of electric vehicles, upon receipt of the amount of stored energy.

* * * * *